US010407985B2

(12) United States Patent
Sylvester et al.

(10) Patent No.: US 10,407,985 B2
(45) Date of Patent: Sep. 10, 2019

(54) CRADLE CLAMP BRACKET ASSEMBLY

(71) Applicant: Panduit Corp., Tinley Park, IL (US)

(72) Inventors: David J. Sylvester, Manhattan, IL (US); Rodney G. Rouleau, Manhattan, IL (US); Raymond M. Hill, Plainfield, IL (US); Andrew Crouse, Bolingbrook, IL (US); Janina B. Nebes, Orland Park, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 15/881,946

(22) Filed: Jan. 29, 2018

(65) Prior Publication Data

US 2018/0163469 A1 Jun. 14, 2018

Related U.S. Application Data

(60) Continuation-in-part of application No. 15/420,178, filed on Jan. 31, 2017, now Pat. No. 9,882,365, which (Continued)

(51) Int. Cl.

*H02G 3/00* (2006.01)
*H02G 3/04* (2006.01)

(Continued)

(52) U.S. Cl.

CPC .............. *E06C 7/14* (2013.01); *F16L 3/1211* (2013.01); *F16L 3/233* (2013.01); *F16L 3/24* (2013.01);

(Continued)

(58) Field of Classification Search

CPC .......... H02G 3/32; H02G 3/0456; E06C 7/14; E06C 7/48; F16L 3/12; F16L 3/1211;

(Continued)

(56) References Cited

U.S. PATENT DOCUMENTS 656,274 A 8/1900 Streeter
2,345,650 A 4/1944 Attwood (Continued)

FOREIGN PATENT DOCUMENTS

AU 2011202448 A1 12/2011
EP 0579929 A1 1/1994

(Continued)

OTHER PUBLICATIONS

Amerifiber, Inc.'s Ladder Rack Cable Rings; printed Sep. 12, 2013; 2 pgs.

(Continued)

*Primary Examiner* — Tan Le

(74) *Attorney, Agent, or Firm* — Christopher S. Clancy; James H. Williams; Aimee E. McVady

(57) ABSTRACT

A bracket assembly that secures cables to rungs of a ladder rack. The bracket has a bottom portion, sidewalls, and an upper portion. The bracket is positioned under the rectangular body of the ladder rung and secured thereto with an interference fit. At least one cable is positioned on the ladder rung and the upper portion of the bracket. A tie secures the cable to the upper portion of the bracket.

9 Claims, 43 Drawing Sheets

870
880
890
860
864
862
900
864
860
862
908
914
912
906
916
910
902
904

Related U.S. Application Data is a division of application No. 14/664,278, filed on Mar. 20, 2015, now Pat. No. 9,587,433.

(60) Provisional application No. 61/970,143, filed on Mar. 25, 2014.

(51) Int. Cl.
*H02G 3/32* (2006.01)
*F16L 3/24* (2006.01)
*E06C 7/14* (2006.01)
*F16L 3/12* (2006.01)
*F16L 3/233* (2006.01)
*E06C 7/48* (2006.01)
*F16C 3/26* (2006.01)
*F16B 2/06* (2006.01)

(52) U.S. Cl.
CPC .......... *H02G 3/0456* (2013.01); *H02G 3/263* (2013.01); *H02G 3/32* (2013.01); *E06C 7/48* (2013.01); *F16B 2/065* (2013.01); *F16C 3/26* (2013.01)

(58) Field of Classification Search
CPC ....... F16L 3/23; F16L 3/24; F16L 3/26; F16L 3/137; F16M 13/022; F16B 2/065
USPC ... 248/65, 68.1, 72, 73, 74.1, 210, 211, 214, 248/222.14, 225.11, 227.4, 228.8, 230.8; 182/115, 119, 129
See application file for complete search history.

(56) References Cited

U.S. PATENT DOCUMENTS 2,375,513 A 5/1945 Bach
2,470,992 A 5/1949 Kindorf et al.
2,675,201 A 4/1954 Friel
2,682,384 A 6/1954 Eichelberger
2,923,510 A 2/1960 Walch
3,053,494 A 9/1962 Stoll
3,131,447 A 5/1964 Tinnerman
3,142,104 A 7/1964 Nielsen, Jr.
3,185,420 A 5/1965 Stewart
3,216,685 A 11/1965 Raymond
3,667,711 A 6/1972 Kissel
3,915,420 A 10/1975 Norris
4,140,417 A 2/1979 Danielsen et al.
4,156,436 A 5/1979 Hawk
4,232,845 A 11/1980 Turner
4,319,724 A 3/1982 Bradbury
4,354,655 A 10/1982 Hengst
4,369,945 A 1/1983 Mantoan et al.
4,432,519 A 2/1984 Wright
4,440,374 A 4/1984 Achille
4,480,810 A 11/1984 Hall
4,502,743 A 3/1985 Ziegler
4,770,378 A 9/1988 Onishi et al.
4,789,286 A 12/1988 Laput
4,802,643 A 2/1989 Uys
4,971,280 A 11/1990 Rinderer
5,054,978 A 10/1991 Kowalski
5,067,863 A 11/1991 Kowalski
5,123,618 A 6/1992 Guterman et al.
5,154,385 A 10/1992 Lindberg et al.
5,221,065 A 6/1993 Siems et al.
5,465,929 A 11/1995 Dooley
5,560,576 A 10/1996 Cargill
5,580,014 A 12/1996 Rinderer
5,687,941 A 11/1997 Quintile
5,730,400 A 3/1998 Rinderer et al.
5,893,538 A 4/1999 Onishi et al.
5,897,082 A 4/1999 Losada
5,961,081 A 10/1999 Rinderer et al.
6,019,322 A 2/2000 Shimizu
6,024,192 A 2/2000 Griffin
6,131,869 A 10/2000 Durham et al.
6,343,771 B1 2/2002 Simon
6,402,096 B1 6/2002 Ismert et al.
6,431,501 B1 8/2002 Molek
6,460,812 B1 10/2002 Jette
6,471,171 B1 10/2002 VanderVelde
6,483,026 B1 11/2002 Snider, Jr. et al.
6,588,711 B2 7/2003 Onishi
6,729,585 B2 5/2004 Ogden
6,926,236 B2 8/2005 Jette
7,677,514 B1 3/2010 Palmer
7,789,359 B2 9/2010 Chopp, Jr. et al.
7,841,566 B2 11/2010 Kellerman
7,903,924 B2 3/2011 Pollard, Jr. et al.
8,136,769 B2 3/2012 Cardin
8,322,661 B2 12/2012 Oh
8,540,191 B2 * 9/2013 Sabadie .................. B64C 1/406 244/117 R
8,931,747 B2 1/2015 Davis
8,985,532 B2 * 3/2015 Chirpich ................ F16L 3/221 248/49
9,261,120 B2 2/2016 Colangelo et al.
9,309,719 B2 * 4/2016 Sylvester ................. E06C 7/14
9,548,598 B2 * 1/2017 Tally ........................ H02G 3/32
9,587,433 B2 3/2017 Sylvester et al.
2008/0264688 A1 10/2008 Chopp et al.
2010/0301178 A1 12/2010 Myers
2012/0037765 A1 2/2012 Guthke et al.
2012/0125663 A1 5/2012 Mabuchi
2015/0275578 A1 10/2015 Sylvester et al.
2016/0025244 A1 1/2016 Tally et al.
2018/0003204 A1 1/2018 Knutson et al.

FOREIGN PATENT DOCUMENTS

EP 2218954 A2 8/2010
WO 8804486 A1 6/1988
WO 9910957 A1 3/1999
WO 2014137461 A1 9/2014

OTHER PUBLICATIONS

Chatsworth Products, Inc.'s Threaded Ceiling Kit product cut sheet; Apr. 2010; 1 pg.
Cooper B-Line, Inc.'s BRC6M Cable Support product sheet; 2012; 1 pg.
Unistrut® Channel Nut webpage; printed Feb. 28, 2014; 1 pg.
Panduit Corp.'s Quicklock Ladder Rack Bracket customer drawing; http://www.panduit.com/heiler/PartDrawings/FR6LRB.pdf; May 11, 2000; retrieved Jun. 2, 2015; 1 pg.
Panduit Corp.'s Ladder Bracket customer drawing; http://www.panduit.com/heiler/PartDrawings/F2PCLB58.pdf; Nov. 9, 2001; retrieved Jun. 2, 2015; 1 pg.

* cited by examiner 10
60
70
80
90
100
102
140
142

CRADLE CLAMP BRACKET ASSEMBLY

CROSS REFERENCE TO RELATED APPLICATION

This application is a continuation-in-part of U.S. patent application Ser. No. 15/420,178, filed Jan. 31, 2017; which will issue as U.S. Pat. No. 9,882,365 on Jan. 30, 2017; which is a divisional of U.S. patent application Ser. No. 14/664,278, filed Mar. 20, 2015, which issued as U.S. Pat. No. 9,587,433 on Mar. 7, 2017; which claims priority to U.S. Provisional Application Ser. No. 61/970,143, filed Mar. 25, 2014, the subject matter of which is hereby incorporated by reference in its entirety.

BACKGROUND OF THE INVENTION

The present invention relates to a bracket assembly, and more particularly to a cradle clamp bracket assembly for securing cables to the rungs of a ladder rack.

Conventional cable cleats have been typically used to secure wire or cable bundles to panels, ladder racks, or similar structural members. The cable cleats include a mounting surface and a body portion that receives the wires or a cable bundles. Conventional cable cleats, however, are generally difficult and time consuming to install. Thus, it is desirable to provide a bracket assembly that is efficiently installed thereby significantly reducing labor costs and increasing productivity.

SUMMARY OF THE INVENTION

The present invention is directed to a cradle clamp bracket assembly that secures cables to rungs of a ladder rack. The cradle clamp bracket assembly includes an elongated bracket with a first portion and a raised second portion. The first portion has a slot located along a center of the bracket. The second portion has a downwardly extending flange and at least one gusset for strengthening the bracket. The cradle clamp bracket assembly also includes a retainer that is received in the slot and engages the rung of the ladder rack to secure the cradle clamp bracket assembly.

Another embodiment of the cradle clamp bracket assembly may include a bracket having an elongated slot and a raised member. The elongated slot extends the length of the bracket at a center of the bracket. A retainer bracket is positioned in the elongated slot. The retainer bracket includes a vertical member and a horizontal member with an opening therethrough for receiving a fastener. A ladder rack is positioned on the bracket between the retainer bracket and the raised member. The fastener is tightened such that the horizontal member of the retainer bracket engages the ladder rack to secure the cradle clamp bracket assembly.

Another embodiment of the cradle clamp bracket assembly may include a bracket having a recessed area with a slot and a raised member. A ladder rung nut is positioned in the recessed area. A fastener extends through the slot of the recessed area into the ladder rung nut and a compression spring engages the fastener. The cradle clamp bracket assembly is positioned under the ladder rack and the ladder rung nut is tightened to engage the ladder rack thereby securing the cradle clamp bracket assembly.

Another embodiment of the bracket assembly may include a bracket with a bottom portion, sidewalls, and an upper portion. The bracket is positioned under the rectangular body of a marine style ladder rung and secured thereto with an interference fit. At least one cable is positioned on the ladder rung and the upper portion of the bracket. A tie secures the cable to the upper portion of the bracket.

DETAILED DESCRIPTION

Figures 1, 2:
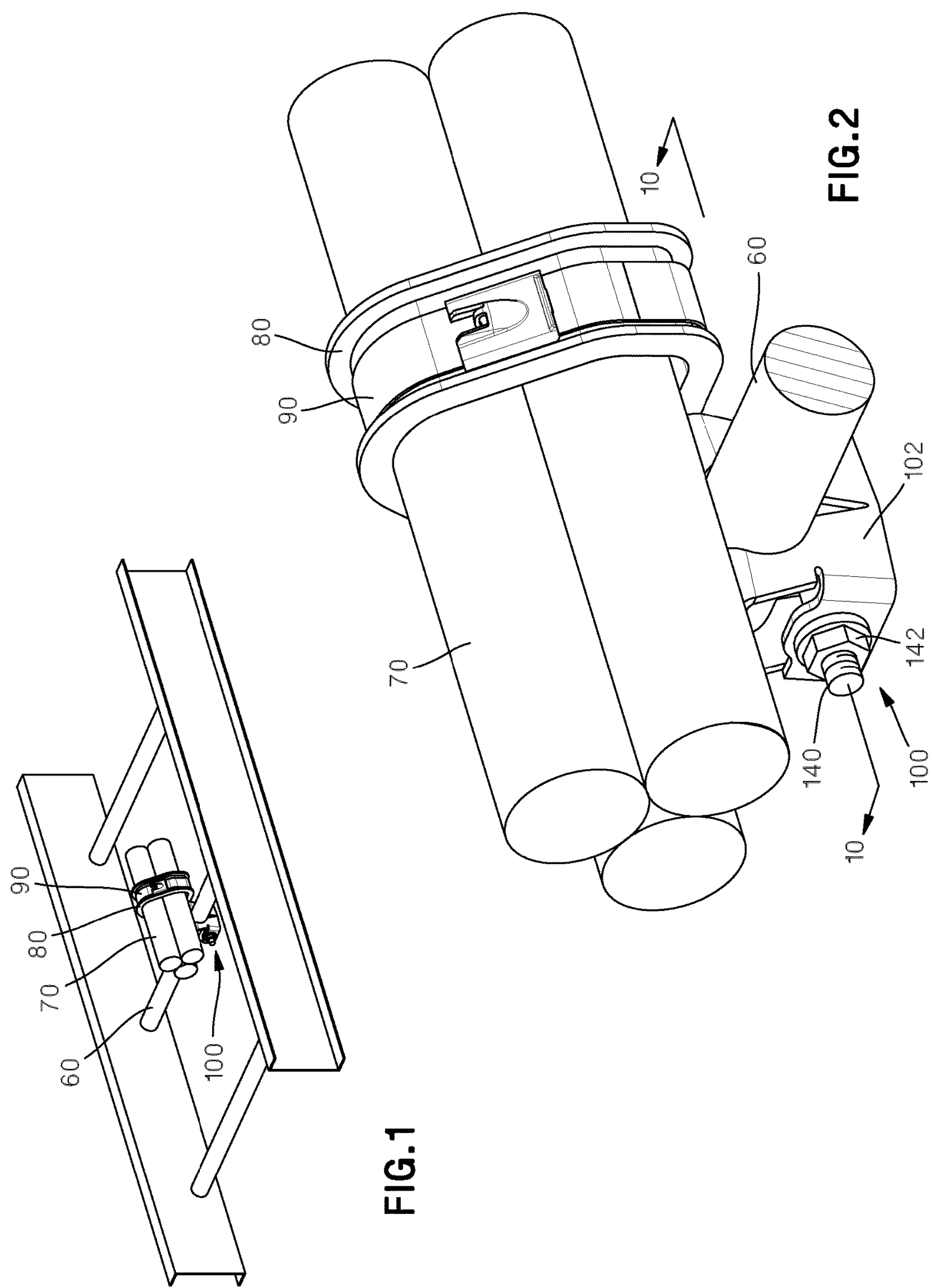
FIG. 1 is a perspective view of the first embodiment of the cradle clamp bracket assembly installed on a ladder rung.
FIG. 2 is a top left perspective view of the cradle clamp bracket assembly of FIG. 1 installed on a ladder rung.
Figure 3:
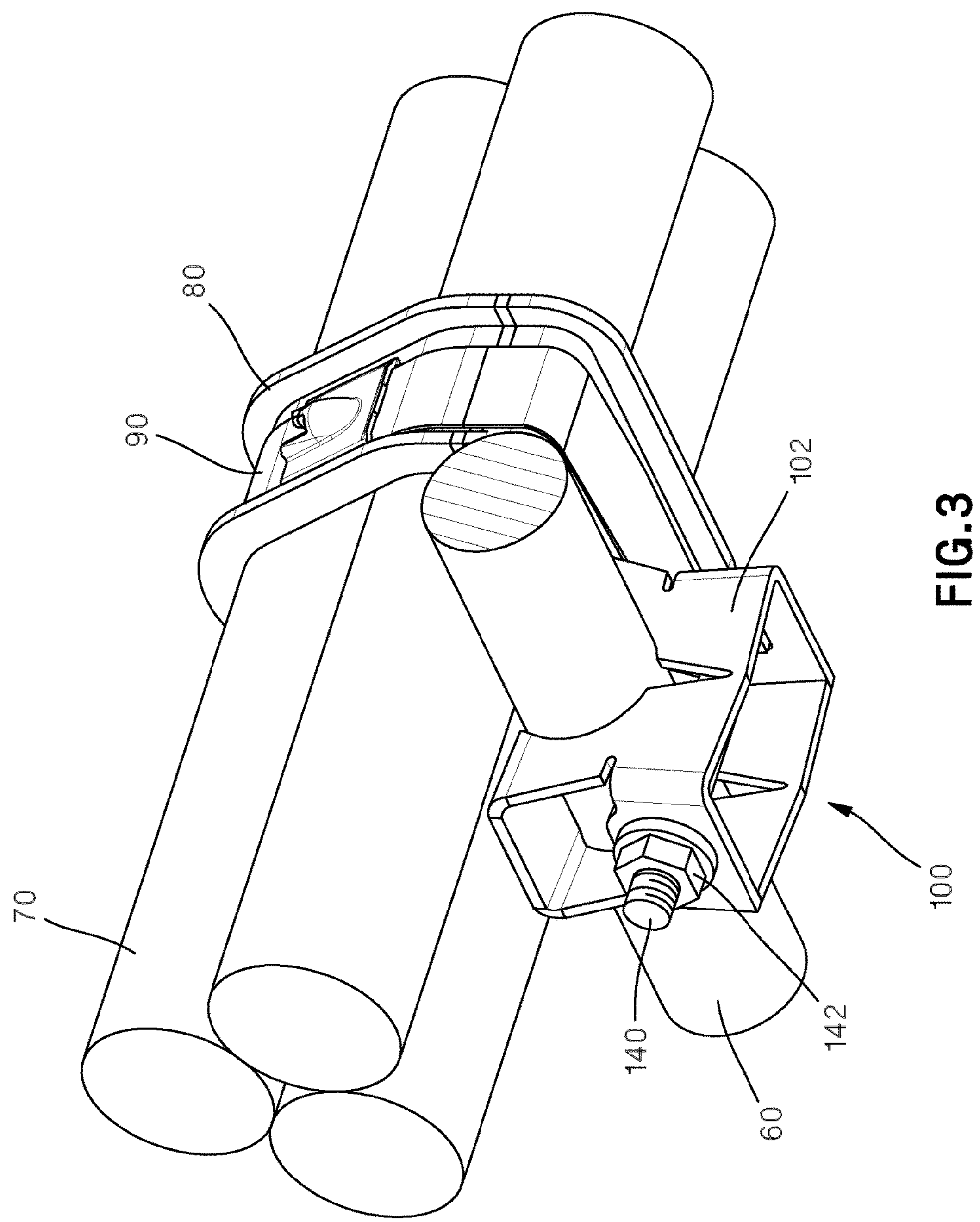
FIG. 3 is a bottom left perspective view of the cradle clamp bracket assembly of FIG. 1 installed on a ladder rung.

The cradle clamp bracket assembly of the present invention secures at least one cable 70 to a ladder rung 60 using a stainless steel tie or strap 90. As described below, the bracket assembly is placed under the ladder rung 60 and secured thereto. A cushion sleeve 80 is wrapped around the cables 70 and a stainless steel tie or strap 90 is wrapped underneath one end of the bracket and the cushion sleeve 80 thereby securing the cables 70 to the ladder rung 60.

Figure 4:
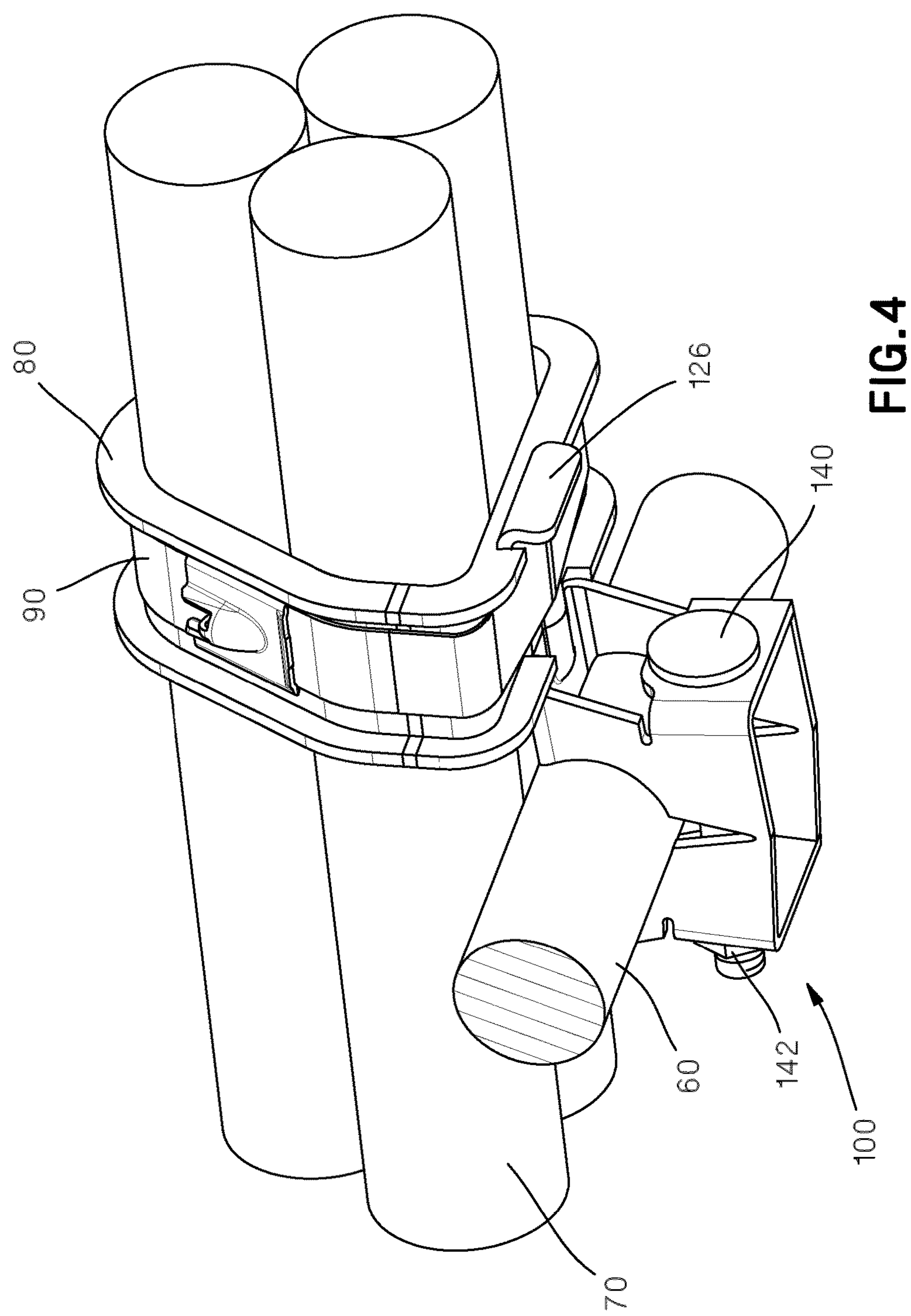
FIG. 4 is a bottom right perspective view of the cradle clamp bracket assembly of FIG. 1 installed on a ladder rung.
Figure 5:
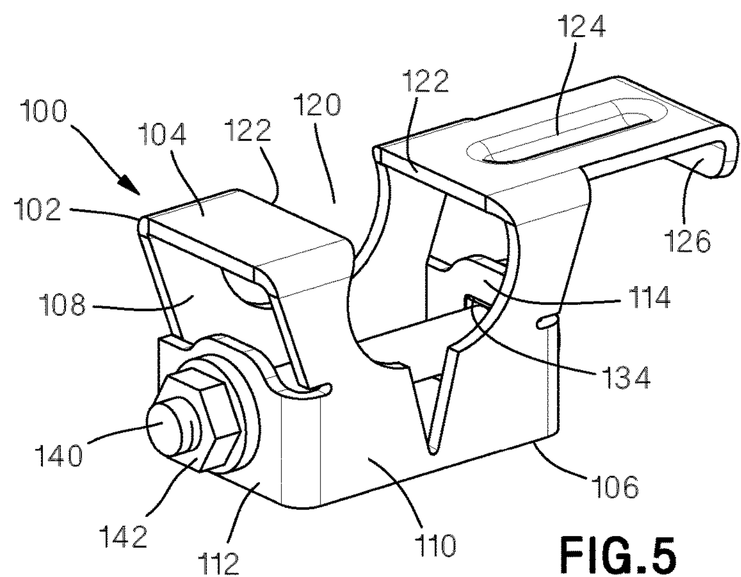
FIG. 5 is a perspective view of the cradle clamp bracket assembly of FIG. 1.
Figure 6:
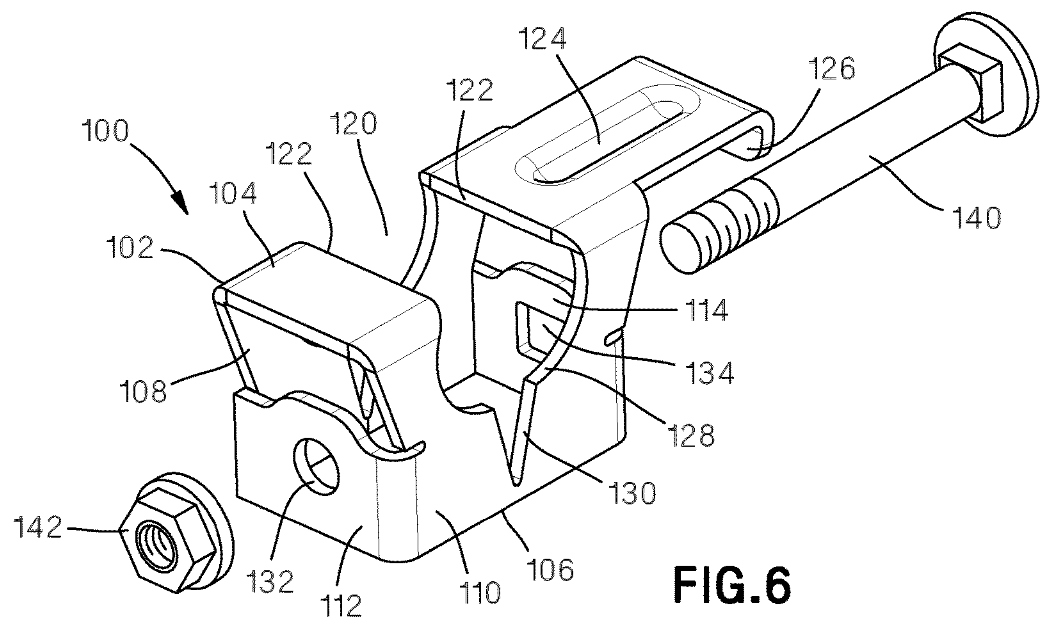
FIG. 6 is an exploded view of the cradle clamp bracket assembly of FIG. 5.

FIGS. 1-10 illustrate a first embodiment of a cradle clamp bracket assembly 100. As illustrated in FIGS. 5 and 6, the cradle clamp bracket assembly 100 includes a one piece metal bracket 102, a carriage bolt 140 and a hex nut 142. The bracket 102 includes a top 104, a bottom 106, a first side 108, a second side 110, a first end 112 and a second end 114. The top 104 of the bracket 102 defines an opening 120 for receiving various sized ladder rungs. The top 104 of the bracket 102 also defines contact points 122 which engage the ladder rung 60 when the cradle clamp bracket assembly 100 is secured. The top 104 of the bracket 102 includes a gusset 124 and a downwardly extending flange 126. The gusset 124 increases the strength of the bracket 102. Each side 108, 110 of the bracket includes an opening 128 for the ladder rung 60 and a V-shaped notch 130. The V-shaped notches 130 enable the bracket 102 to engage the ladder rung 60 when the nut 142 is tightened. A first end 112 of the bracket 102 includes a circular opening 132 and a second end 114 of the bracket 102 includes a rectangular opening 134 for receiving the carriage bolt 140.

Figure 7:
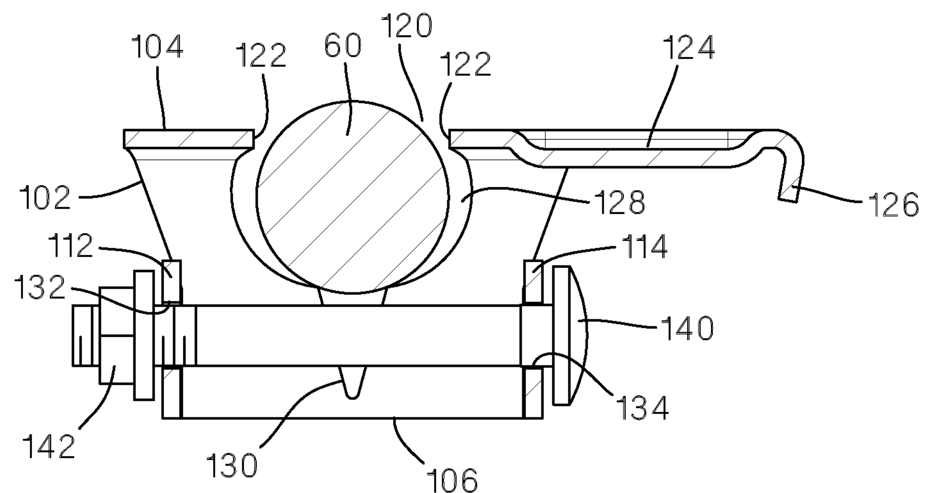
FIG. 7 is a side view of the cradle clamp bracket assembly of FIG. 1 positioned on a ladder rung.
Figure 8:
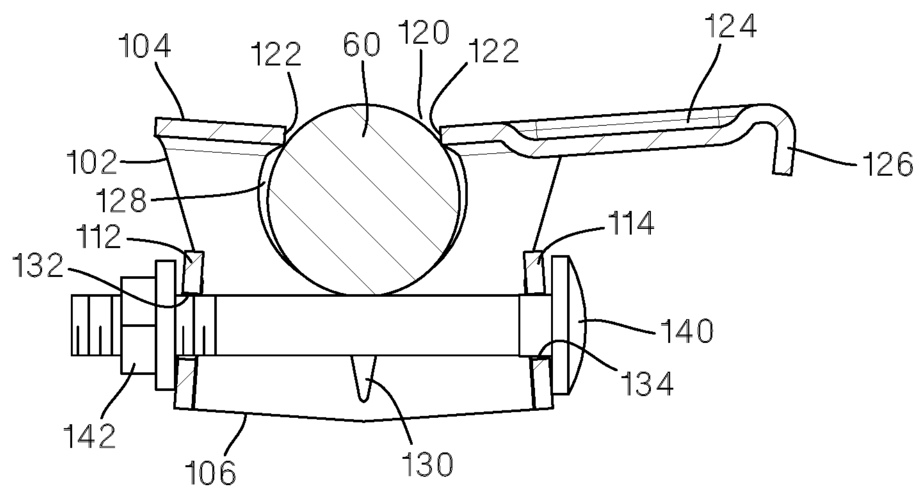
FIG. 8 is a side view of the cradle clamp bracket assembly of FIG. 7 with the nut tightened to secure the cradle clamp bracket assembly to the ladder rung.
Figure 9:
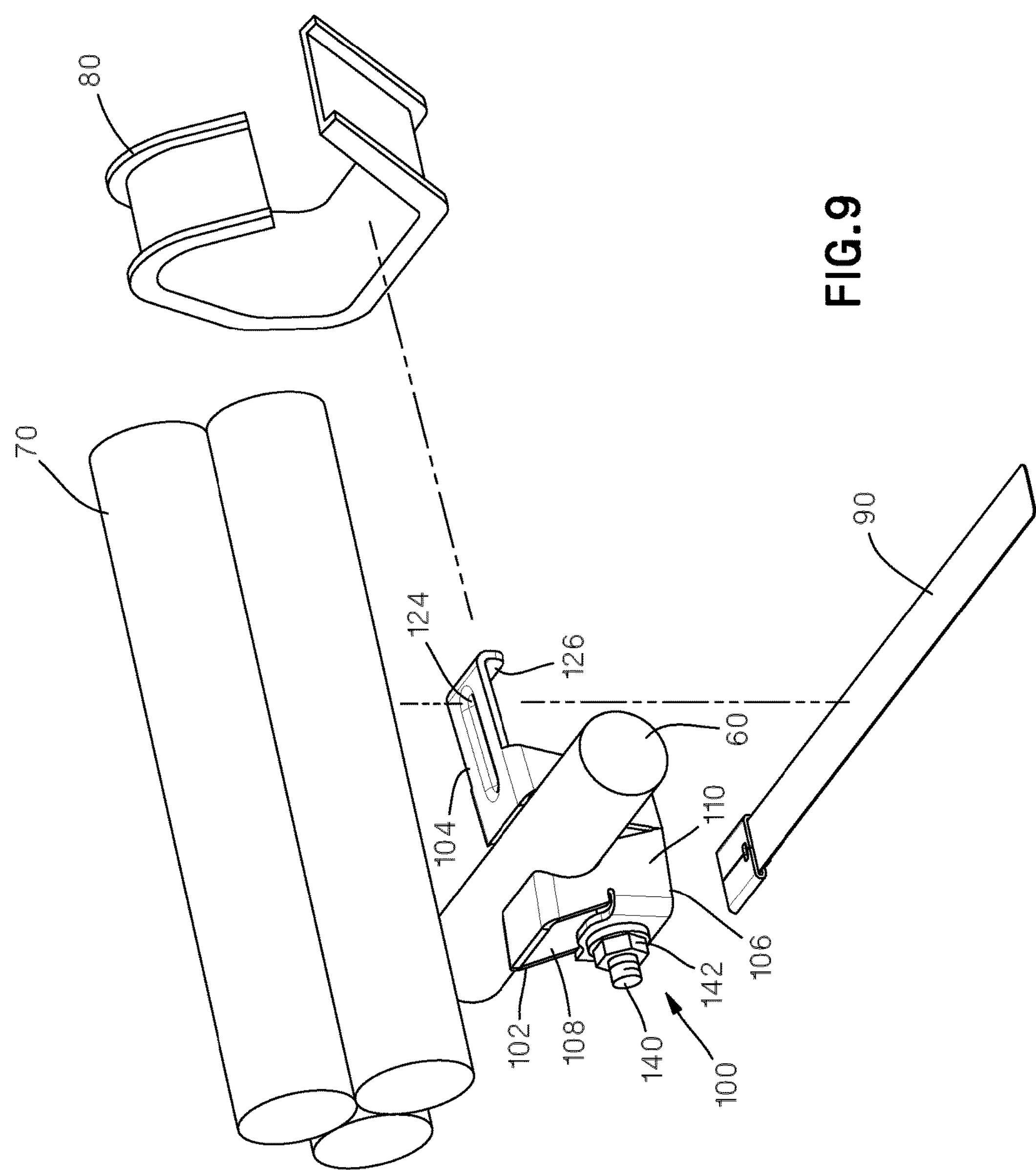
FIG. 9 is a partially exploded perspective view of the cradle clamp bracket assembly of FIG. 2 positioned to receive the cables, cushion sleeve and stainless steel tie or strap.
Figure 10:
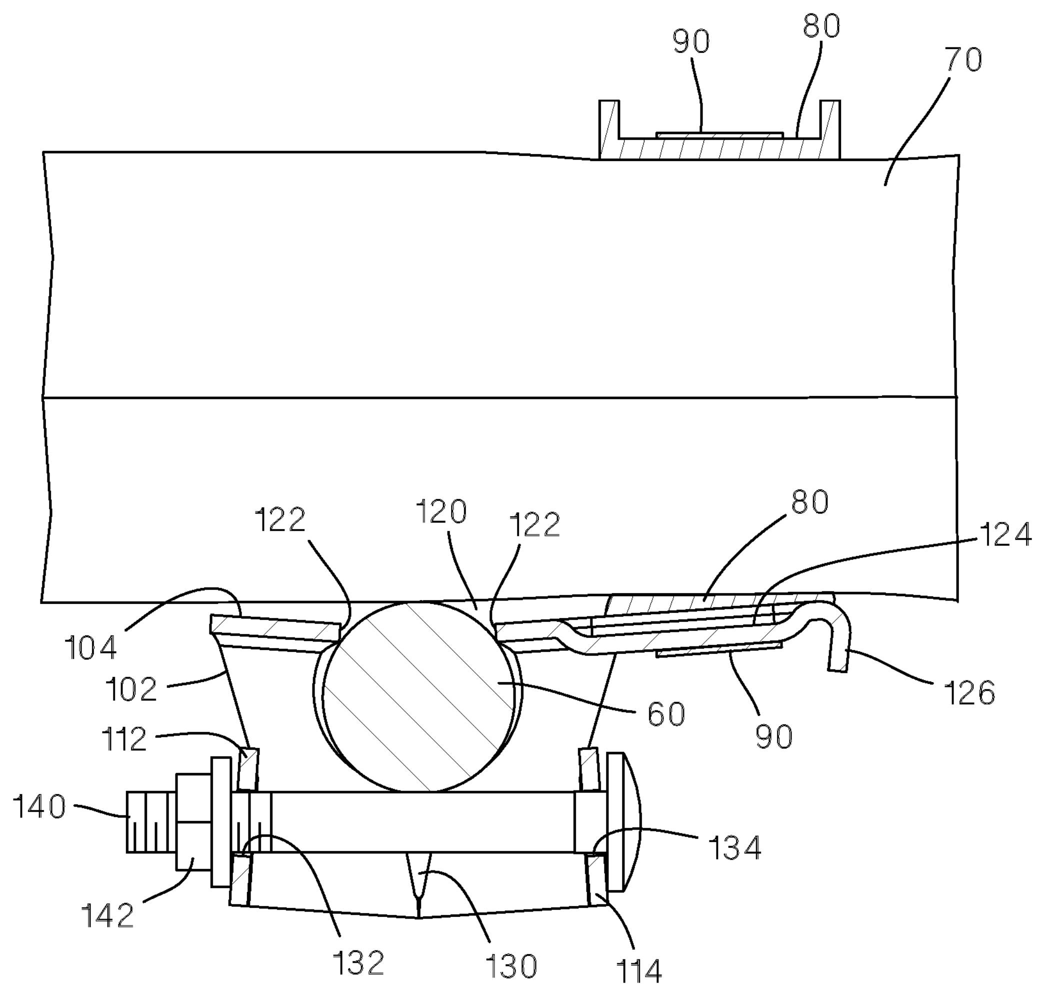
FIG. 10 is a cross sectional view of the cradle clamp bracket assembly installed on a ladder rung of FIG. 2 taken along line 10-10.
Figure 11:
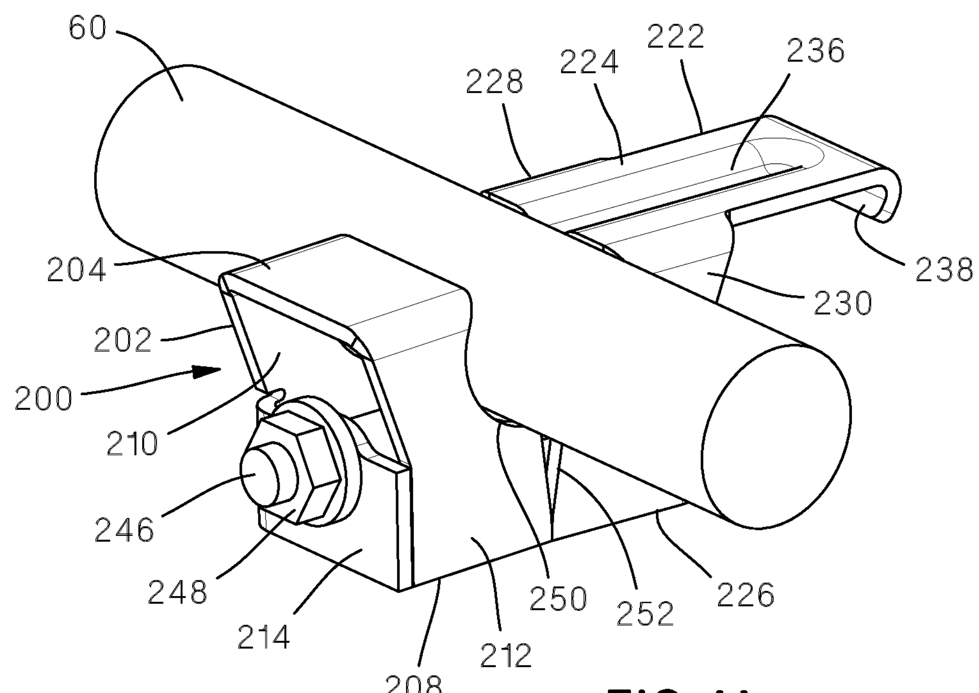
FIG. 11 is a top perspective view of the second embodiment of the cradle clamp bracket assembly of the present invention installed on a ladder rung.
Figure 12:
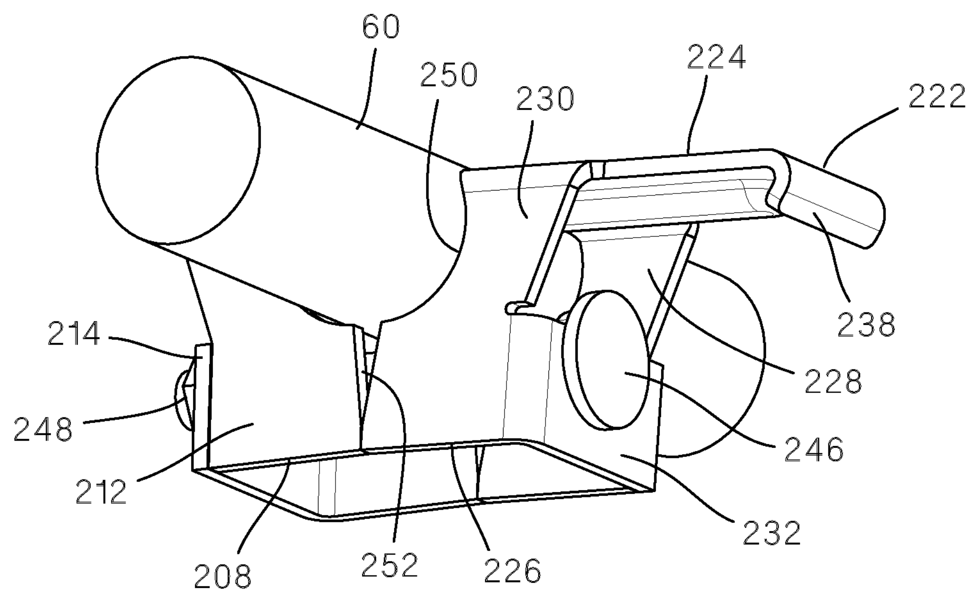
FIG. 12 is a bottom perspective view of the cradle clamp bracket assembly installed on a ladder rung of FIG. 11.

FIGS. 7-10 illustrate the installation of the cradle clamp bracket assembly 100. As illustrated in FIG. 7, the bracket 102 is placed under a ladder rung 60. Next, as illustrated in FIG. 8, the nut 142 is tightened to secure the bracket assembly 100 to the ladder rung 60. The contact points 122 engage the ladder rung 60 creating a contact force on the ladder rung 60 thereby controlling the lateral and rotational movement of the ladder rung 60. As illustrated in FIG. 9, a cushion sleeve 80 is wrapped around the cables 70. The cushion sleeve 80 and cables 70 are positioned on the top 104 of the bracket 102. The stainless steel tie or strap 90 is wrapped around the cushion sleeve 80 and under the bracket 102 as illustrated in FIGS. 4 and 10. A tool (not illustrated) is used to tension the tie or strap 90 to complete the installation of the cradle clamp bracket assembly 100.

Figure 13:
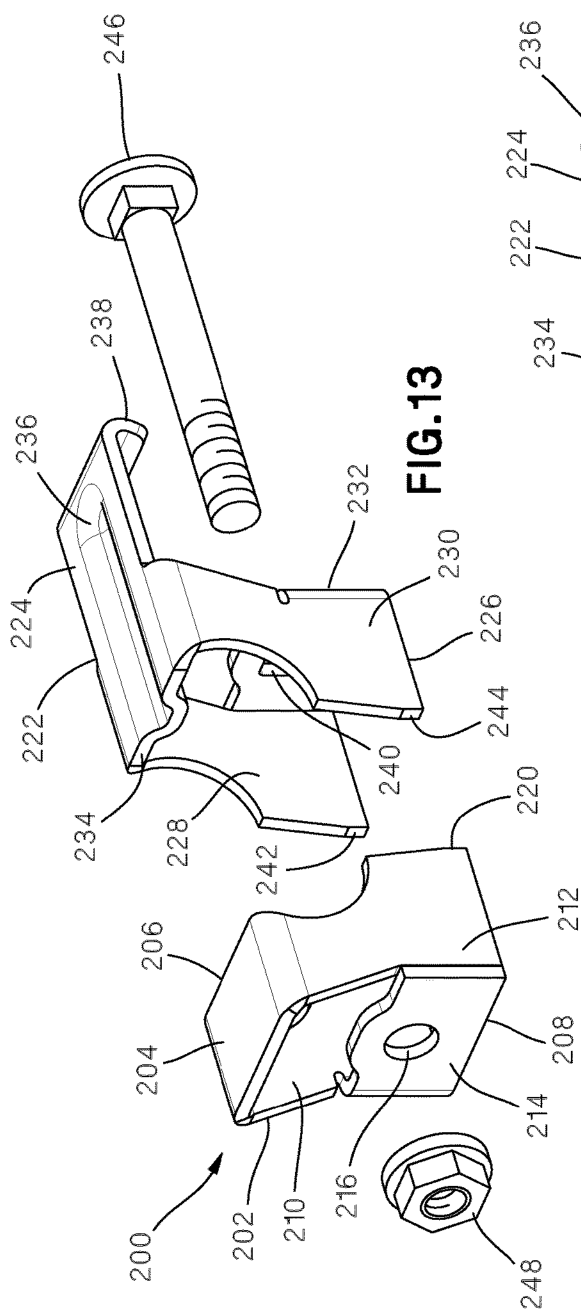
FIG. 13 is an exploded perspective view of the cradle clamp bracket assembly of FIG. 11.

FIGS. 11-16 illustrate a second embodiment of a cradle clamp bracket assembly 200. As illustrated in FIG. 13, the cradle clamp bracket assembly 200 includes a retainer bracket 202, a metal bracket 222, a carriage bolt 246 and a nut 248. The retainer bracket 202 includes a top 204 with a contact point 206, a bottom 208, a first side 210, a second side 212 and an end 214. The end 214 includes a circular opening 216 for receiving the carriage bolt 246 when the bracket is assembled. The first side 210 and the second side 212 include edges 218, 220, respectively, that define pivot points.

Figure 14:
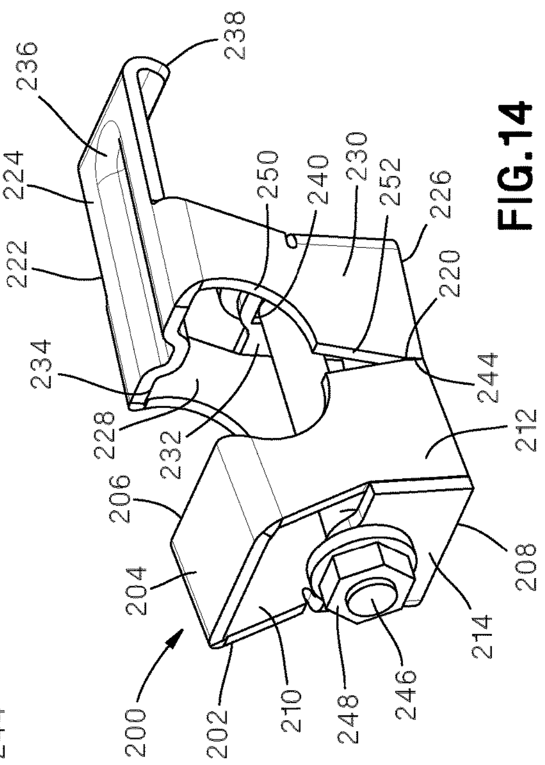
FIG. 14 is an assembled perspective view of the cradle clamp bracket assembly of FIG. 13.

The metal bracket 222 includes a top 224, a bottom 226, a first side 228, a second side 230 and end 232. The top 224 includes a contact point 234, a gusset 236 and a downwardly extending flange 238. The gusset 236 increases the strength of the metal bracket 222. The end 232 includes a rectangular opening 240 for receiving the carriage bolt 246 when the retainer bracket 202 and the metal bracket 222 are assembled. The first side 228 and the second side 230 include edges 242, 244, respectively, that define pivot points. The pivot points compress around the ladder rung 60 when the bolt 246 is tightened. As illustrated in FIG. 14, the retainer bracket 202 and the metal bracket 222 are secured together via the carriage bolt 246 and nut 248. The cradle clamp bracket assembly 200 defines an opening 250 for receiving various sized ladder rungs. The cradle clamp bracket assembly 200 also defines V-shaped notches 252 for enabling the cradle clamp bracket 200 to engage the ladder rung 60 when the cradle clamp bracket assembly 200 is installed on the ladder rung 60.

Figure 15:
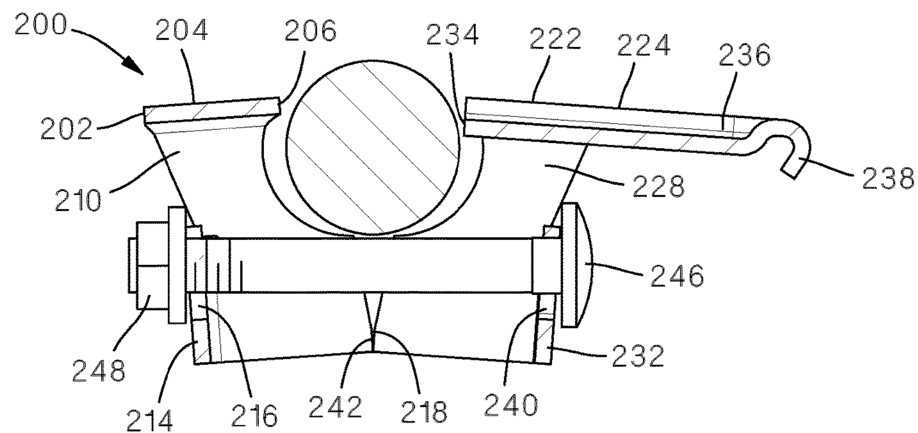
FIG. 15 is a cross sectional view of the cradle clamp bracket assembly of FIG. 14 positioned on a ladder rung.
Figure 16:
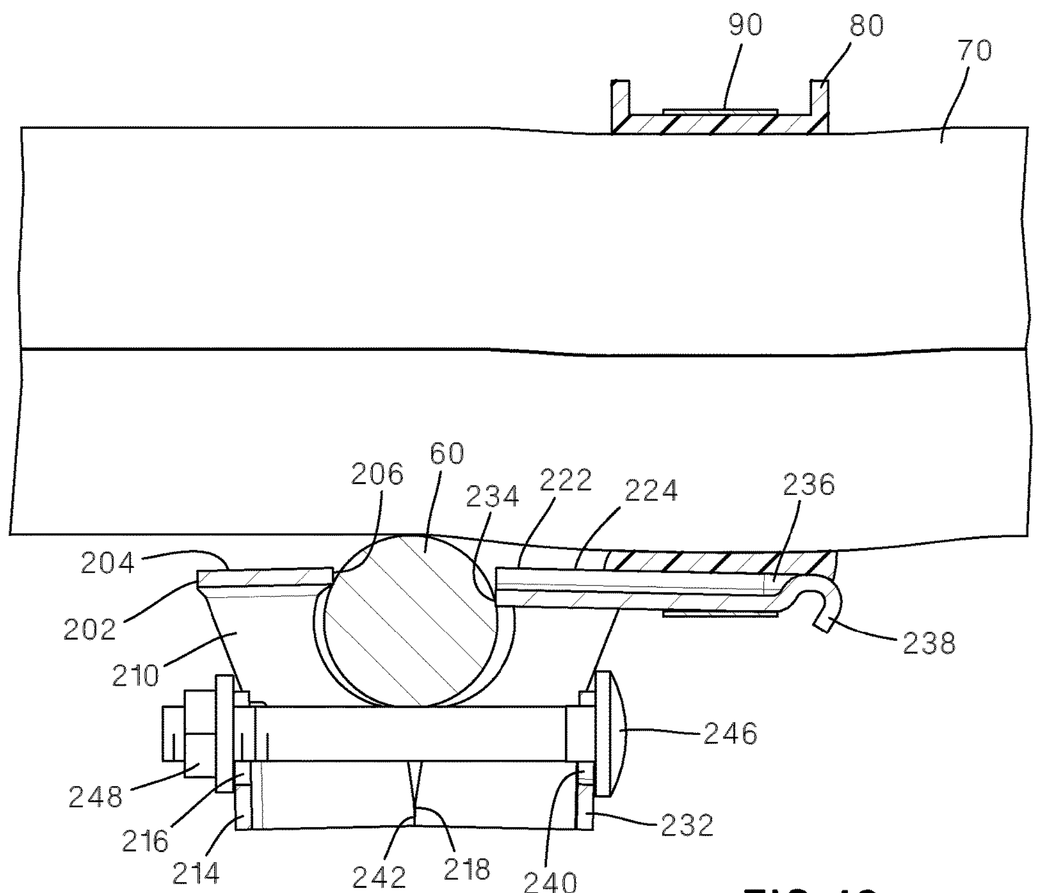
FIG. 16 is a cross sectional view of the cradle clamp bracket assembly installed on the ladder rung of FIG. 11 with cables, cushion sleeve and stainless steel tie or strap secured thereto.
Figure 17:
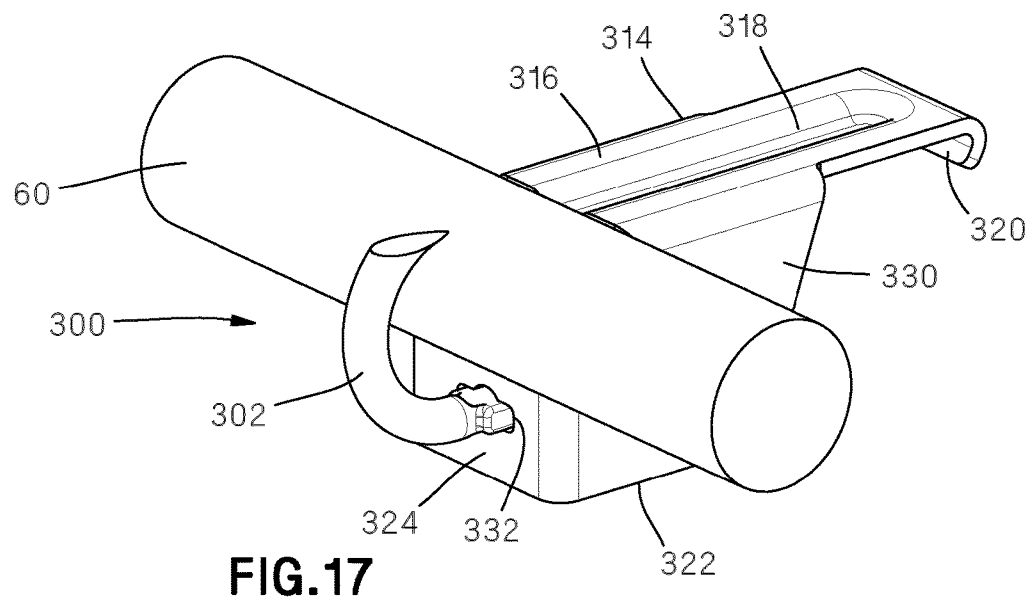
FIG. 17 is a top perspective view of the third embodiment of the cradle clamp bracket assembly of the present invention installed on a ladder rung.
Figure 18:
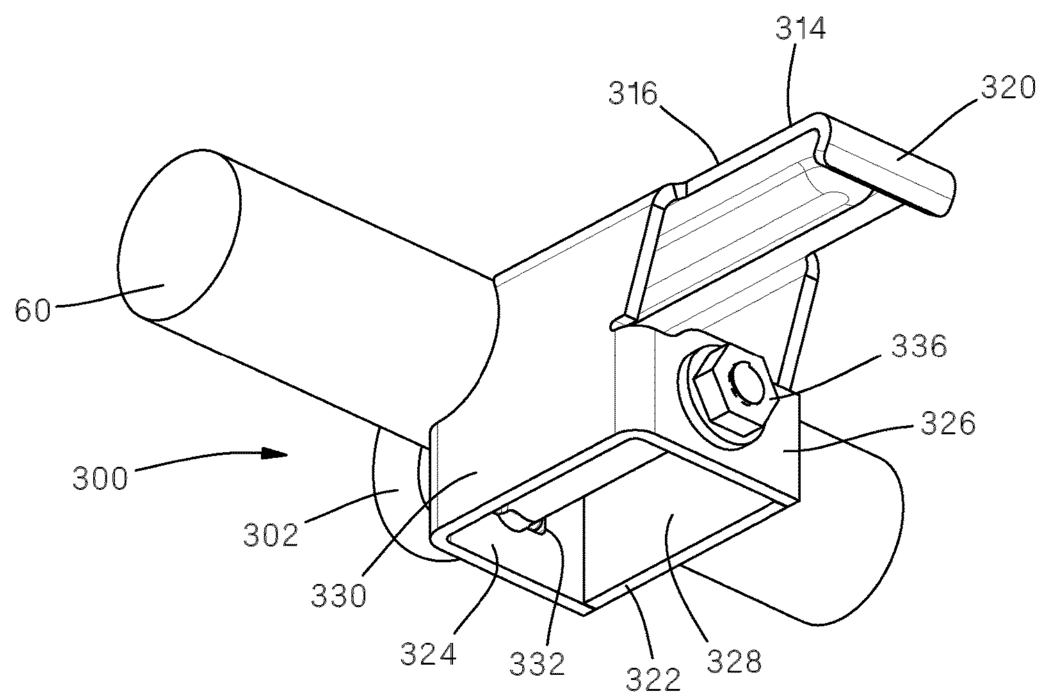
FIG. 18 is a bottom perspective view of the cradle clamp bracket assembly installed on a ladder rung of FIG. 17.

As illustrated in FIGS. 15-16, the cradle clamp bracket assembly 200 is installed on a ladder rung similar to the cradle clamp bracket assembly 100 of FIGS. 1-10. As illustrated in FIG. 15, the cradle clamp bracket assembly 200 is placed under a ladder rung 60. The nut 248 is tightened to secure the cradle clamp bracket assembly 200 to the ladder rung 60. A cushion sleeve 80 is wrapped around the cables 70. The cushion sleeve 80 and cables 70 are positioned on the top 224 of the metal bracket 222 of cradle clamp bracket assembly 200. The stainless steel tie or strap 90 is wrapped around the cushion sleeve 80 and under the cradle clamp bracket assembly 200 as illustrated in FIG. 16. A tool (not illustrated) is used to tension the tie or strap 90 to complete the installation of the cradle clamp bracket assembly 200.

Figure 19:
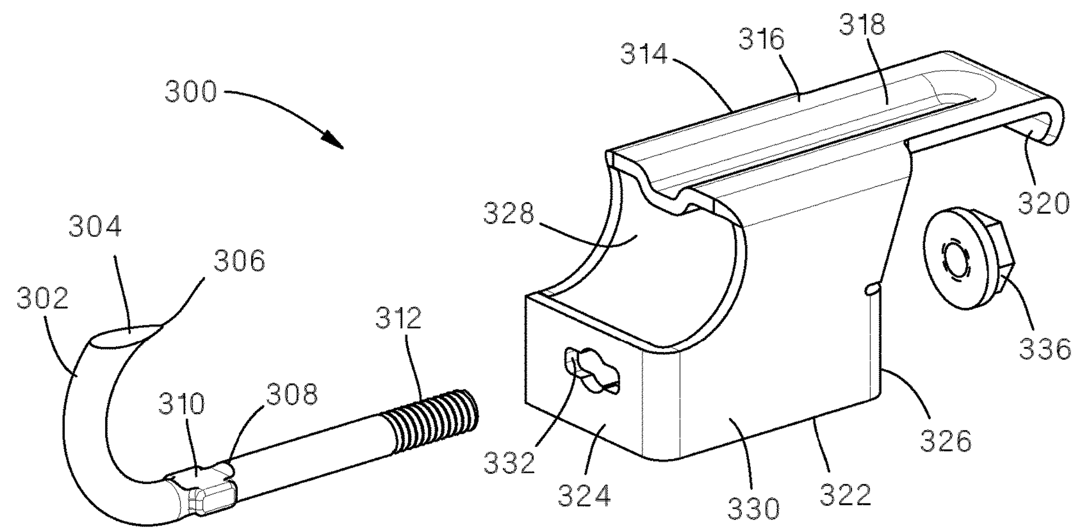
FIG. 19 is an exploded perspective view of the cradle clamp bracket assembly of FIG. 17.
Figure 20:
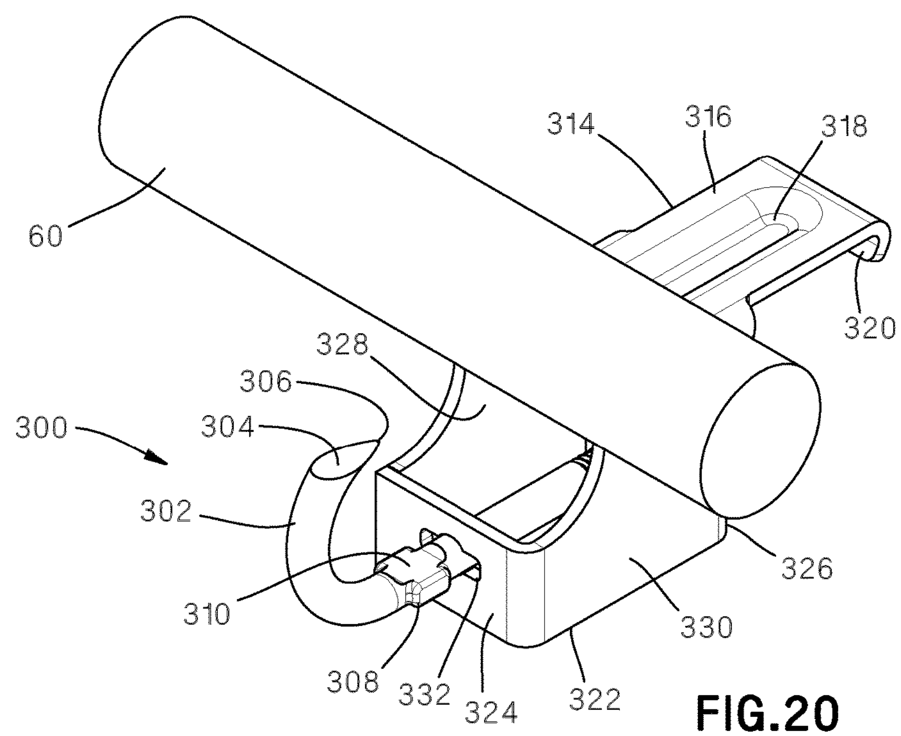
FIG. 20 is an assembled perspective view of the cradle clamp bracket assembly of FIG. 19 with a ladder rung positioned to be installed.
Figure 21:
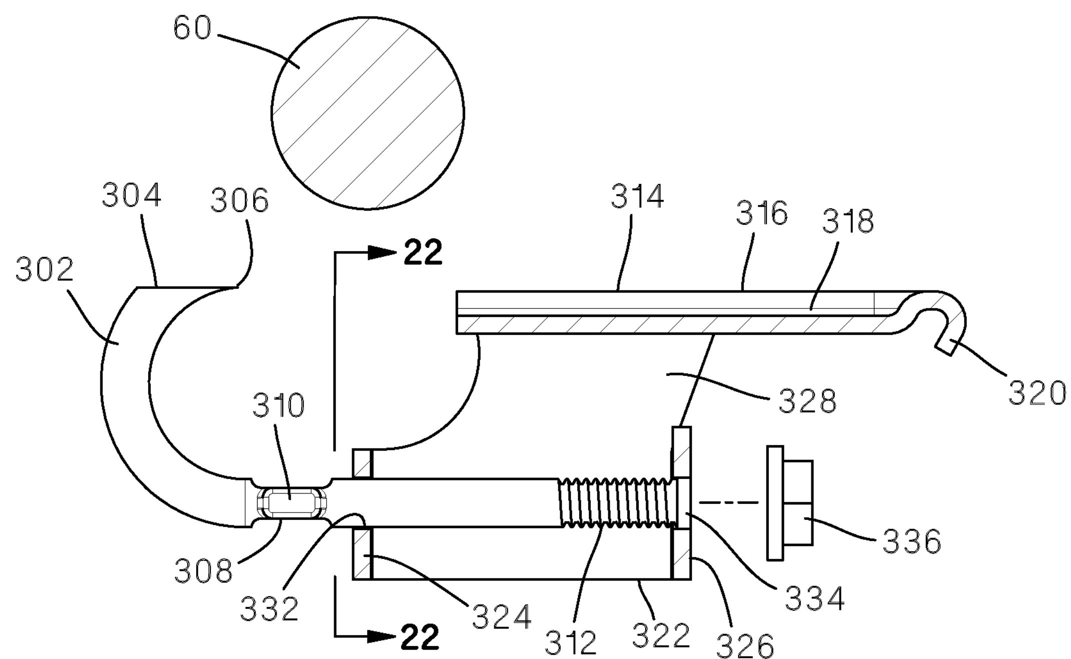
FIG. 21 is a cross sectional view of the cradle clamp bracket assembly and ladder rung of FIG. 20.
Figure 22:
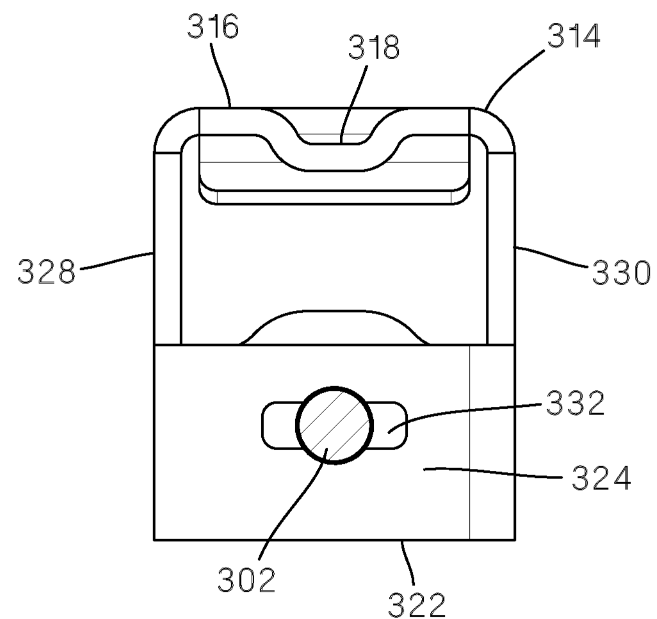
FIG. 22 is a cross sectional view of the cradle clamp bracket assembly of FIG. 21 taken along line 22-22.
Figure 23:
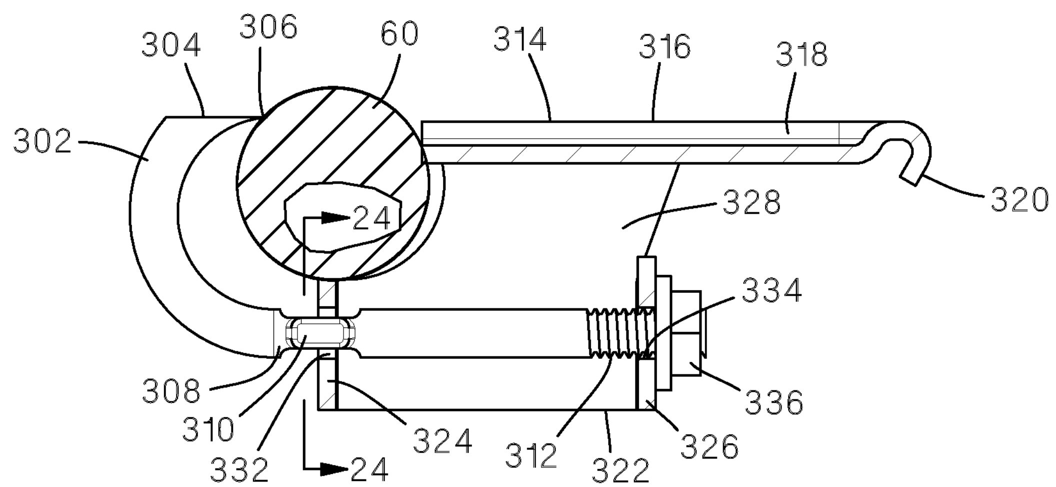
FIG. 23 is a cross sectional view of the cradle clamp bracket assembly of FIG. 21 with the ladder rung installed in the cradle clamp bracket assembly and the nut secured to the J hook.
Figure 24:
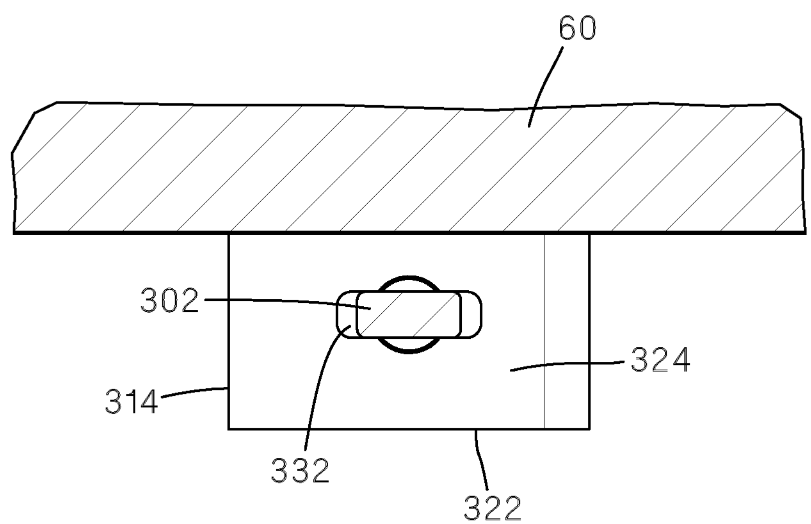
FIG. 24 is a cross sectional view of the cradle clamp bracket assembly of FIG. 23 taken along line 24-24.

FIGS. 17-24 illustrate a third embodiment of a cradle clamp bracket assembly 300. As illustrated in FIG. 19, the cradle clamp bracket assembly 300 includes a J-hook 302, a metal bracket 314 and a nut 336. The J-hook 302 includes a top 304 with a contact point 306, a center 308 with a flat member 310 and a threaded end 312. The metal bracket 314 includes a top 316 with a gusset 318 and a downwardly extending flange 320. The gusset 318 increases the strength of the metal bracket 314. The metal bracket 314 also includes a bottom 322, a first end 324, a second end 326, a first side 328 and a second side 330. The first end 324 includes a notch 332 for receiving the flat portion 310 of the J-hook 302 and the second end 326 includes an opening 334 for receiving the threaded end 312 of the J-hook 302.

As illustrated in FIGS. 20-24, the cradle clamp bracket assembly 300 is secured to the ladder rack similar to the installation of the cradle clamp bracket assembly 200 described above. The cradle clamp bracket assembly 300 is positioned under the ladder rung 60 (see FIG. 23). The nut 336 is tightened to secure the cradle clap bracket assembly 300 to the ladder rung 60. The contact point 306 on the J-hook 302 creates a concentrated force on the ladder rung 60 when secured in place. The cushion sleeve 80, cables 70 and stainless steel tie or strap 90 are installed on the cradle clamp bracket assembly 300 and ladder rung 60 as described above with respect to the cradle clamp bracket assemblies 100, 200 illustrated in FIGS. 1-16.

FIGS. 25-36 illustrate a fourth embodiment of a cradle clamp bracket assembly 400 of the present invention installed on a rectangular ladder rung 62. The cradle clamp bracket assembly 400 includes a metal bracket 402, a retainer bracket 412, and a fastener 440, such as a bolt. The metal bracket 402 includes an elongated rectangular slot 404 for receiving the fastener 440 and retainer bracket 412. One end of the metal bracket 402 also includes a raised member 406 with a downwardly extending flange 408 for receiving the cushion sleeve 80 and stainless steel tie or strap 90.

The retainer bracket 412 includes a top 414 with a circular opening 416 for receiving the fastener 440. One end of the top wraps around to provide a reinforcing layer 418. The reinforcing layer 418 also includes a circular opening 420 aligned with the circular opening 416 of the top 414 for receiving the fastener 440. The retainer bracket 412 includes first and second outer side walls 422, 424, respectively. Each outer side wall 422, 424 wraps around and extends under the top 414 to form first and second inner side members 426, 428 spaced from the first and second outer side walls 422, 424. Each inner side member 426, 428 includes a foot 430. The foot 430 of each inner side member 426, 428 is positioned within the elongated slot 404 in the metal bracket 402 when the cradle clamp bracket 400 is assembled. One end of the retainer bracket 412 includes a plurality of teeth 432 extending from the top 414 and a flange 434 extending from each side 422, 424. The plurality of teeth 432 and each flange 434 are contact points that create a concentrated force on the ladder rung 62 when the cradle clamp bracket assembly 400 is installed.

Figure 29:
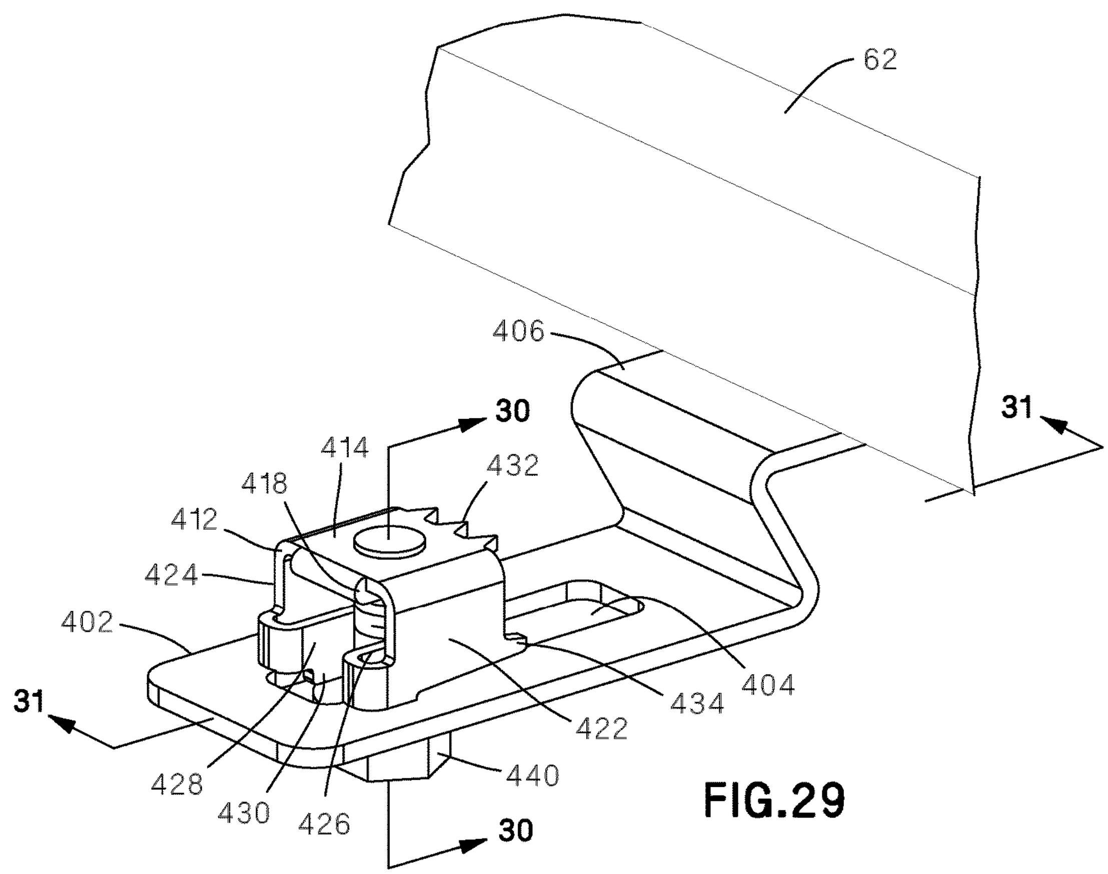
FIG. 29 is an assembled perspective view of the cradle clamp bracket assembly of FIG. 27 positioned to be installed on a ladder rung.
Figure 30:
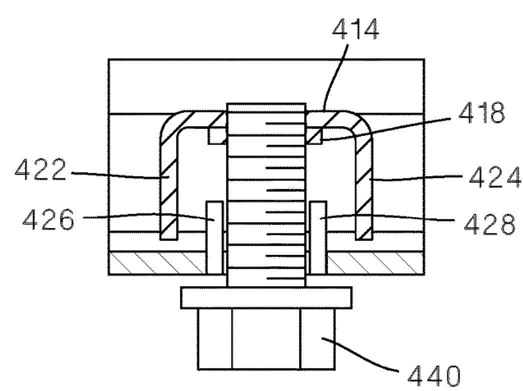
FIG. 30 is a cross sectional view of the cradle clamp bracket assembly taken along line 30-30 of FIG. 29.
Figure 31:
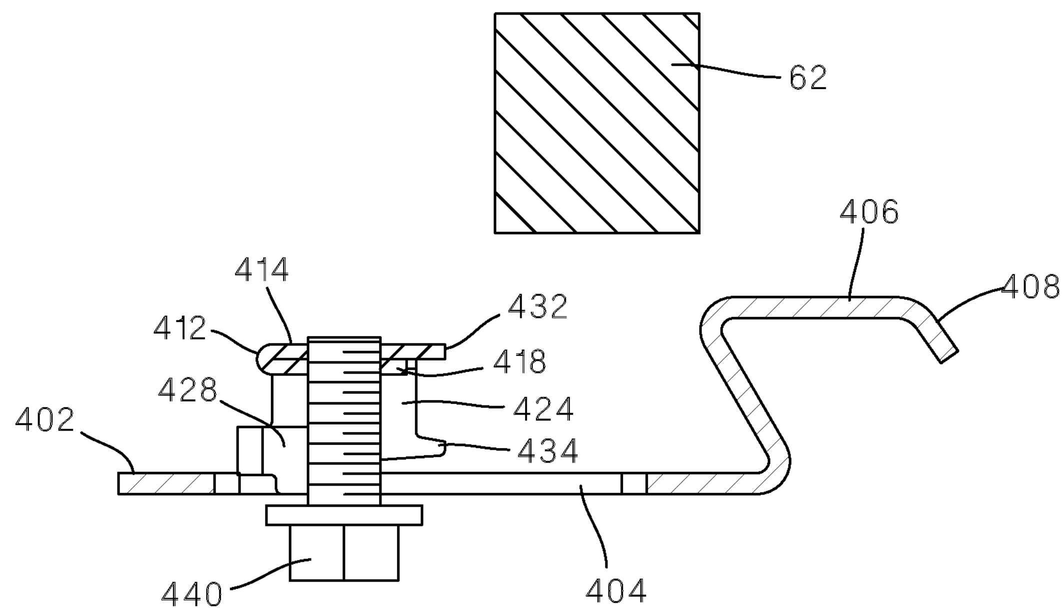
FIG. 31 is a cross sectional view of the cradle clamp bracket assembly taken along line 31-31 of FIG. 29.

As illustrated in FIGS. 29-31, the cradle clamp bracket assembly 400 is positioned under a ladder rung 62. The retainer bracket 412 is slid against the ladder rung 62 to lock it in place. The bolt 440, or other fastener, is tightened to secure the cradle clamp bracket assembly 400 to the ladder rung 62.

Figure 25:
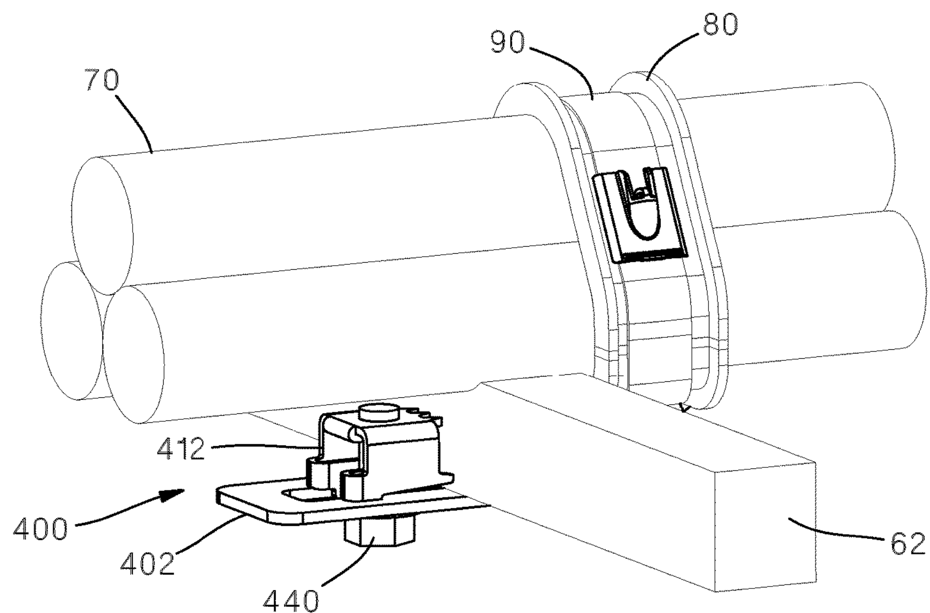
FIG. 25 is a perspective view of the fourth embodiment of the cradle clamp bracket assembly installed on a ladder rung.
Figure 26:
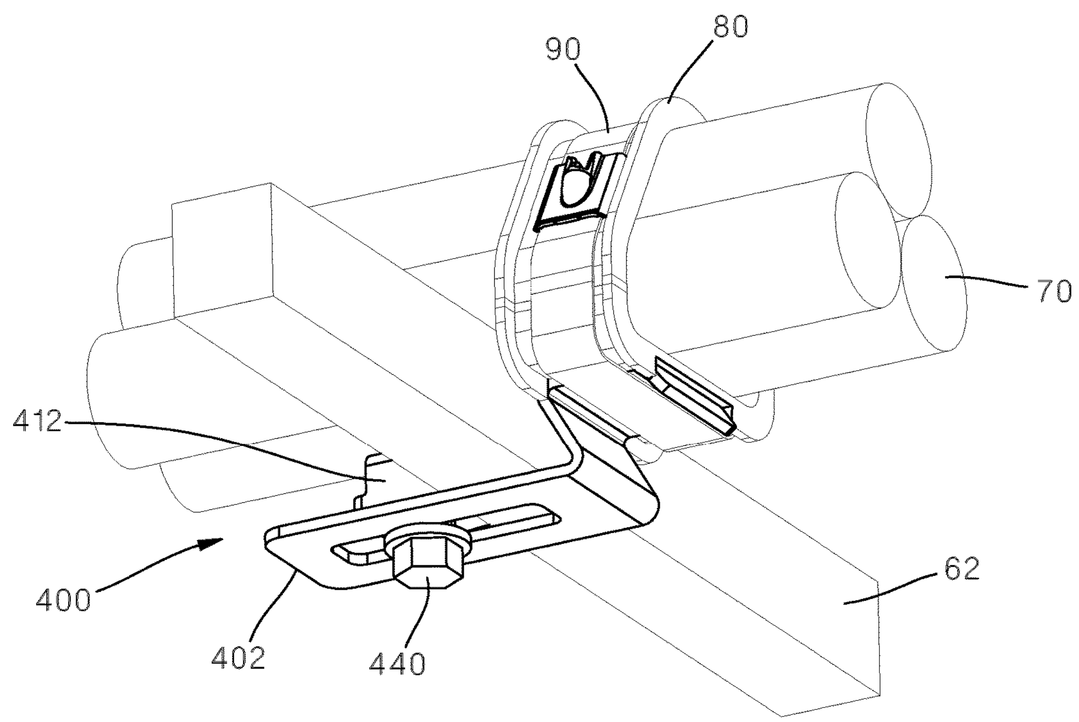
FIG. 26 is a bottom perspective view of the cradle clamp bracket assembly of FIG. 25 installed on a ladder rung.
Figure 27:
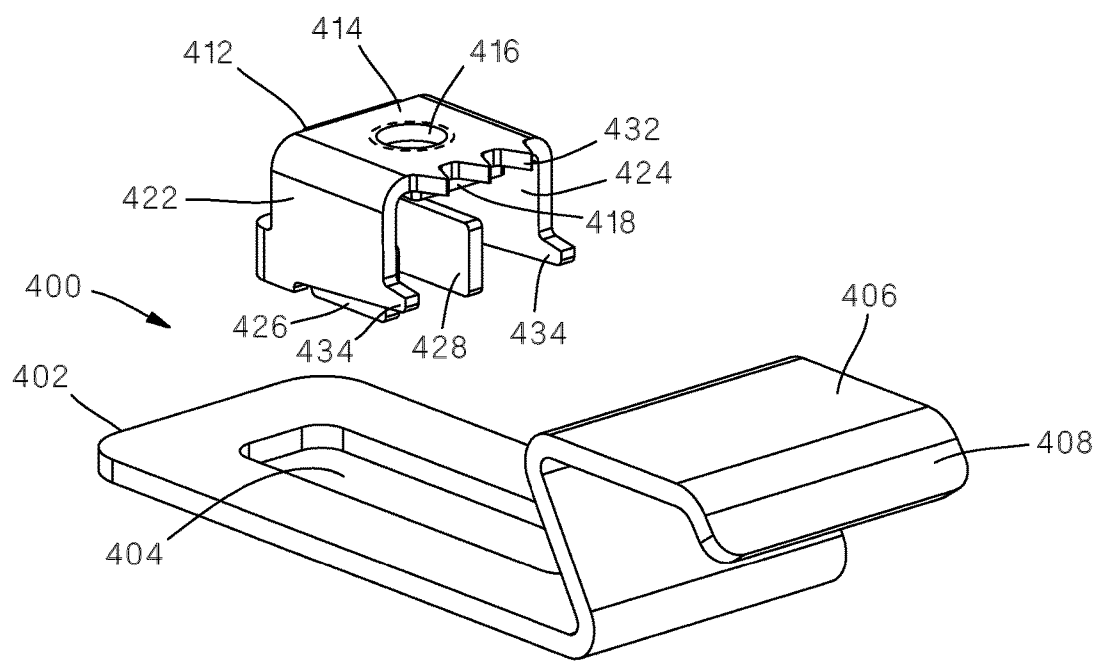
FIG. 27 is an exploded perspective view of the cradle clamp bracket assembly of FIG. 25.
Figure 27:
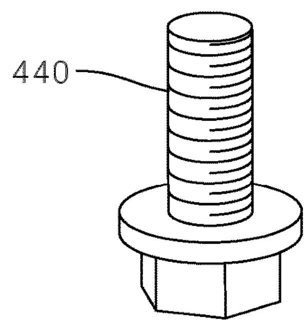
Figure 28:
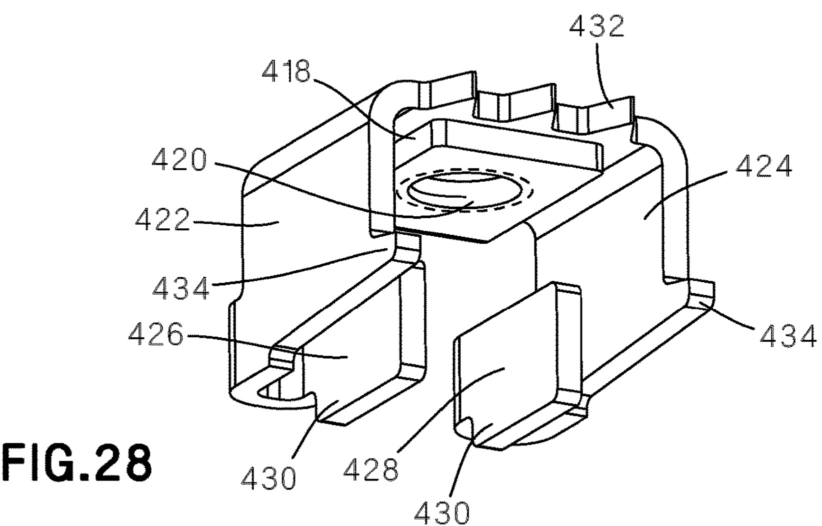
FIG. 28 is a bottom perspective view of the retainer bracket of FIG. 27.
Figure 32:
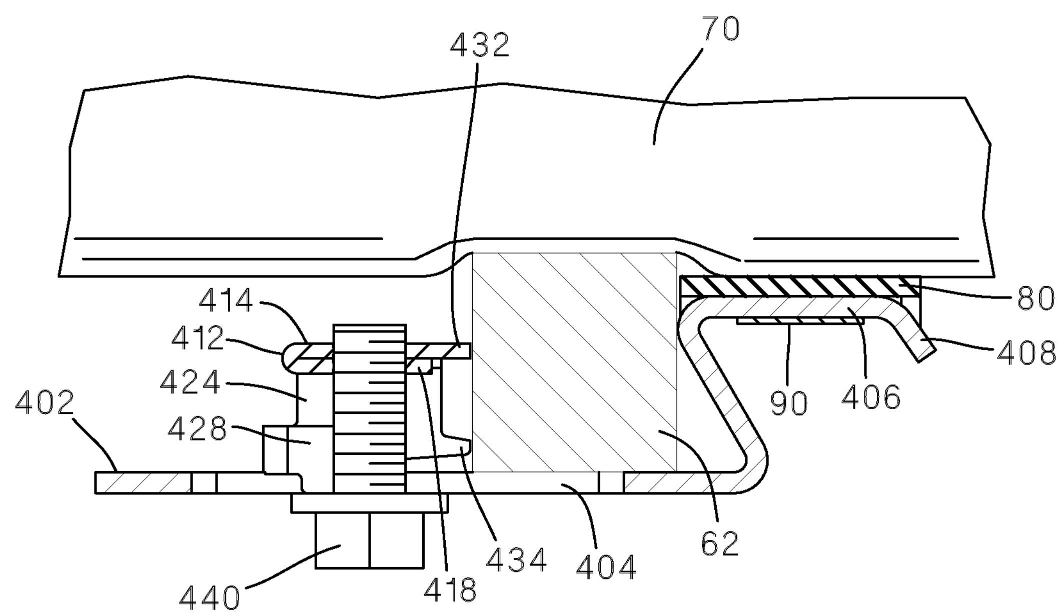
FIG. 32 is a cross sectional view of the cradle clamp bracket assembly of FIG. 25 installed on a rectangular ladder rung.
Figure 33:
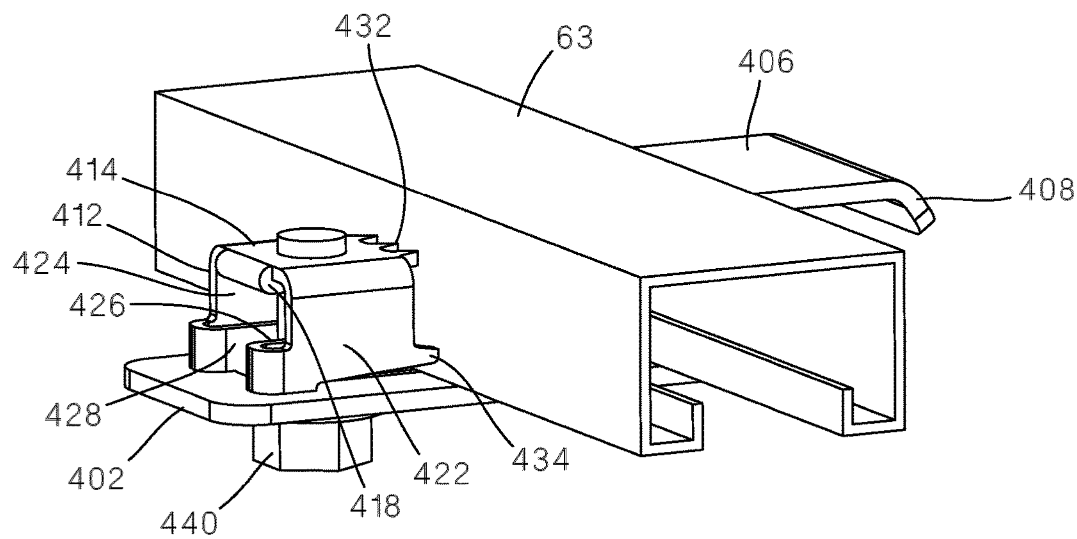
FIG. 33 is a perspective view of the cradle clamp bracket assembly of FIG. 25 installed on a ladder rung with flanged ends.
Figure 34:
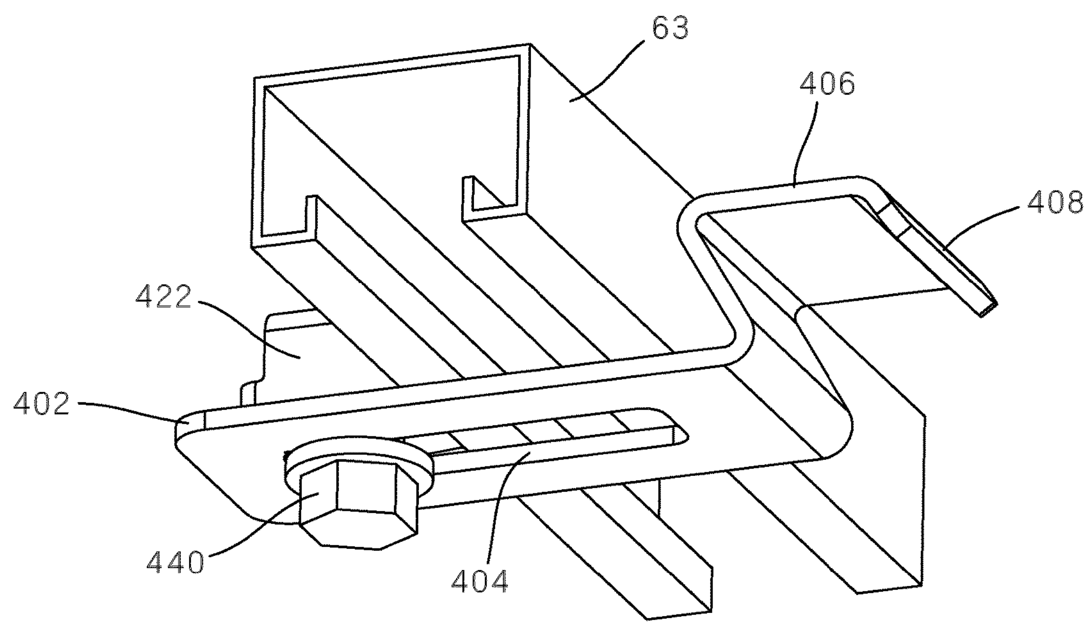
FIG. 34 is a bottom perspective view of the cradle clamp bracket assembly and ladder rung of FIG. 33.

As illustrated in FIGS. 25, 26 and 32, a cushion sleeve 80 is wrapped around the cables 70 and a stainless steel tie or strap 90 is wrapped underneath the raised member 406 at the end of metal bracket 402 and cushion sleeve 80 securing the cables 70 to the ladder rung 62. A tool (not illustrated) is used to tension the tie or strap 90 thereby completing installation of the cradle clamp bracket assembly 400.

Figure 35:
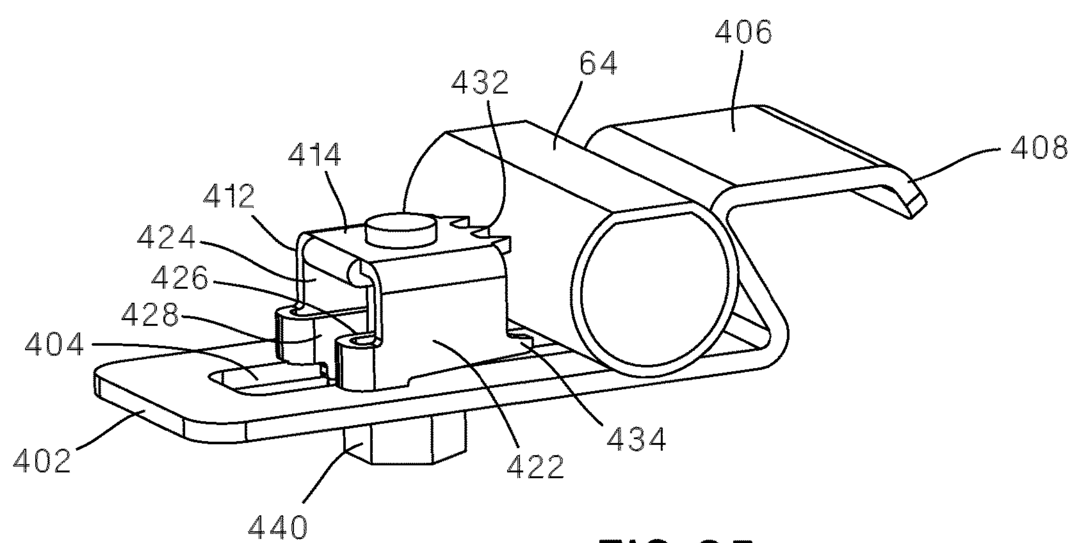
FIG. 35 is a perspective view of the cradle clamp bracket assembly of FIG. 25 installed on a round ladder rung.
Figure 36:
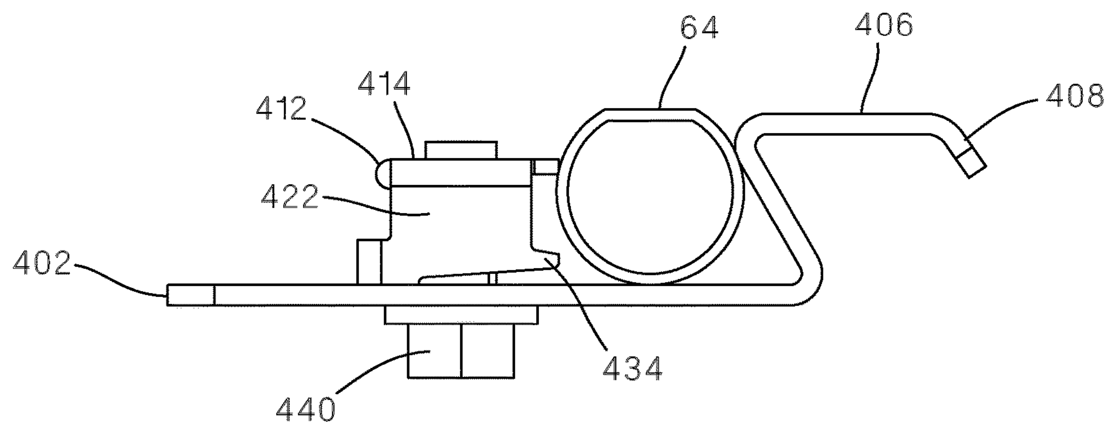
FIG. 36 is a side view of the cradle clamp bracket assembly and ladder rung of FIG. 35.
Figure 37:
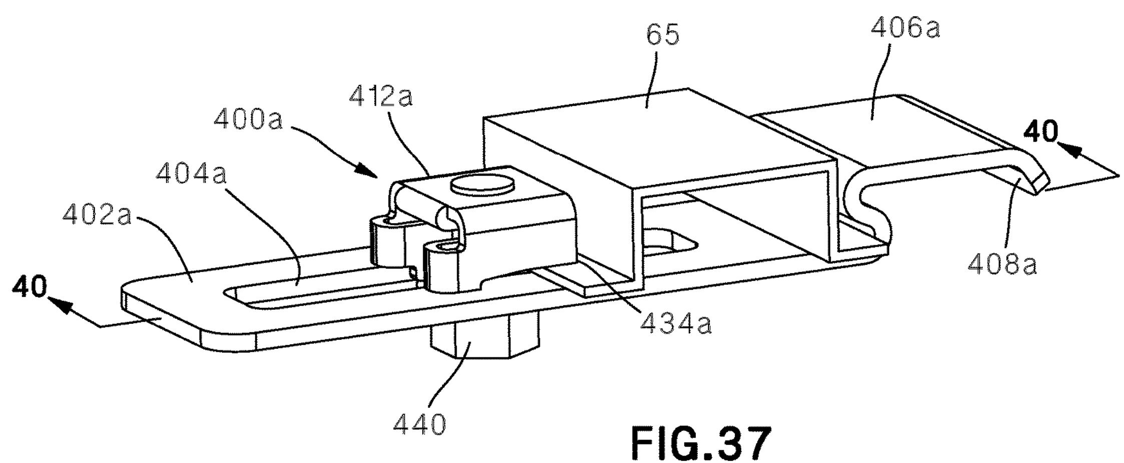
FIG. 37 is a perspective view of an alternative cradle clamp bracket assembly installed on a top hat ladder rung.
Figure 38:
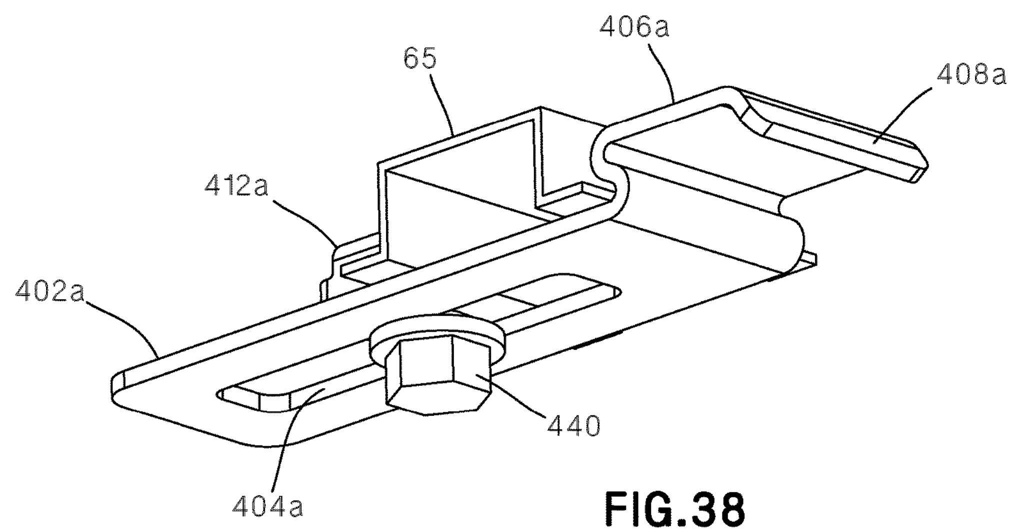
FIG. 38 is a bottom perspective view of the cradle clamp bracket assembly of FIG. 37.
Figure 41:
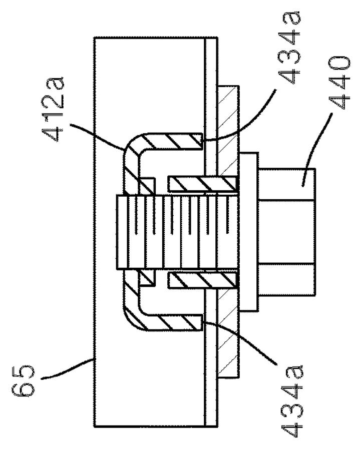
FIG. 41 is a cross sectional view of the cradle clamp bracket assembly taken along line 41-41 of FIG. 40.
Figure 40:
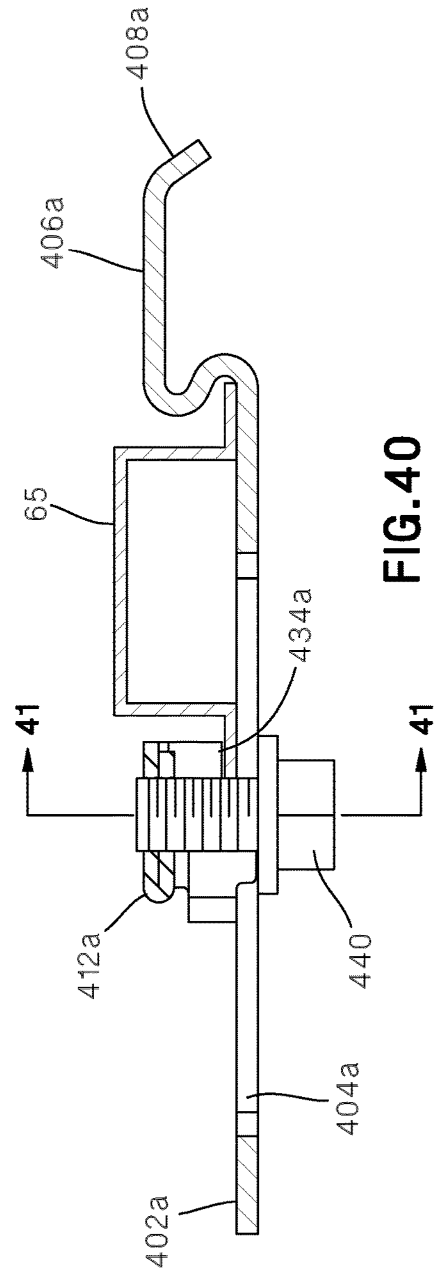
FIG. 40 is a cross sectional view of the cradle clamp bracket assembly and top hat ladder rung taken along line 40-40 of FIG. 37.
Figure 39:
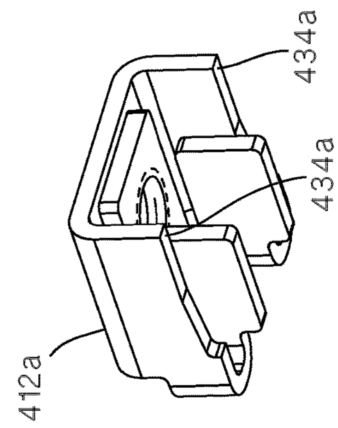
FIG. 39 is a bottom perspective view of the retainer bracket of the cradle clamp bracket assembly of FIG. 37.
Figure 42:
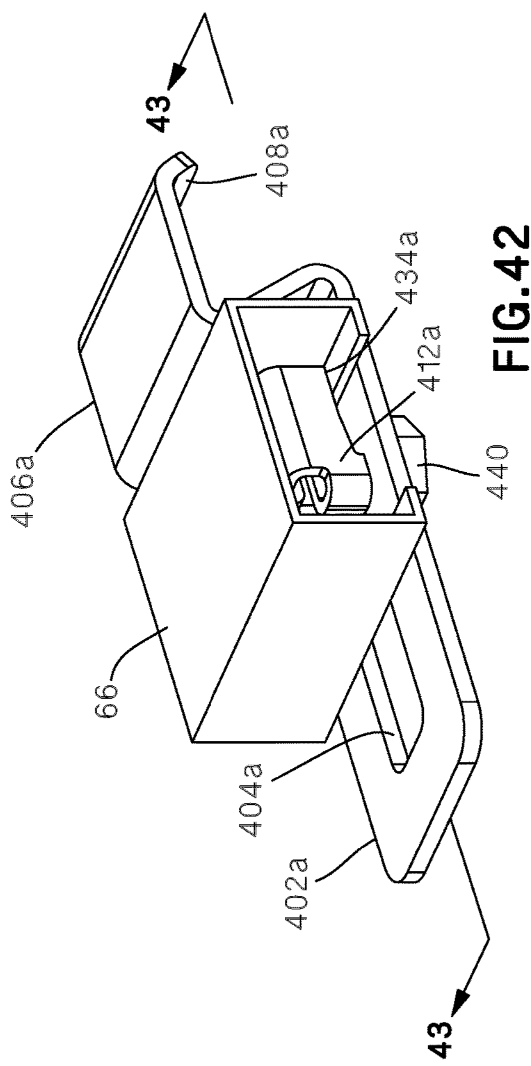
FIG. 42 is a perspective view of the cradle clamp bracket assembly of FIG. 37 installed on a strut rung.
Figure 43:
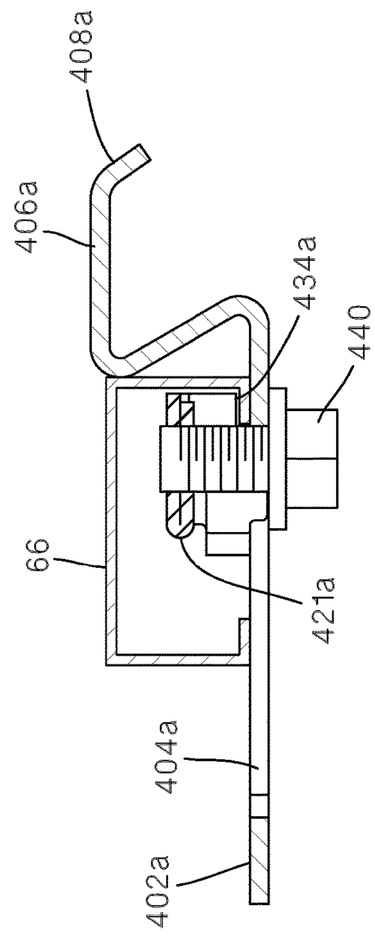
FIG. 43 is a cross sectional view of the cradle clamp bracket assembly taken along line 43-43 of FIG. 42.
Figure 44:
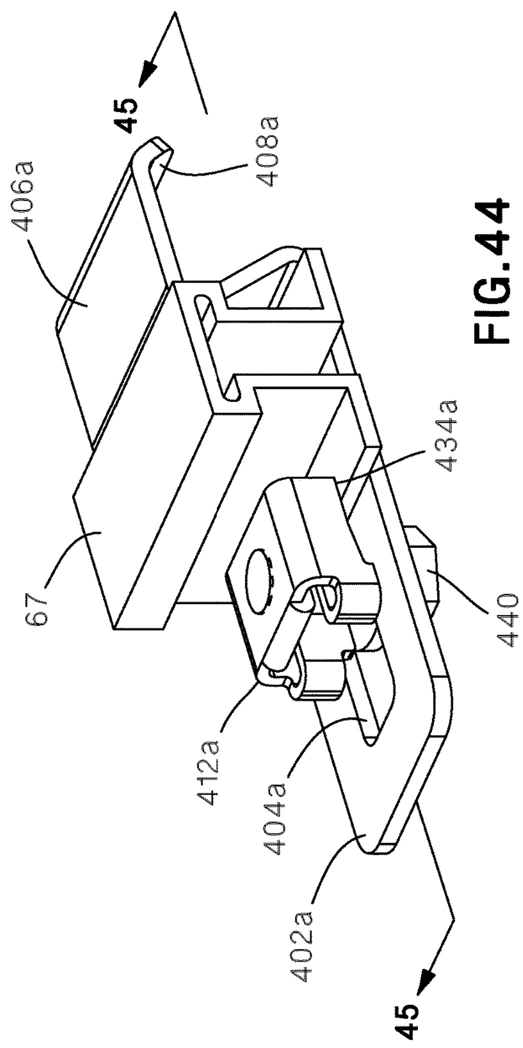
FIG. 44 is a perspective view of the cradle clamp bracket assembly of FIG. 37 installed on a beam rung.
Figure 45:
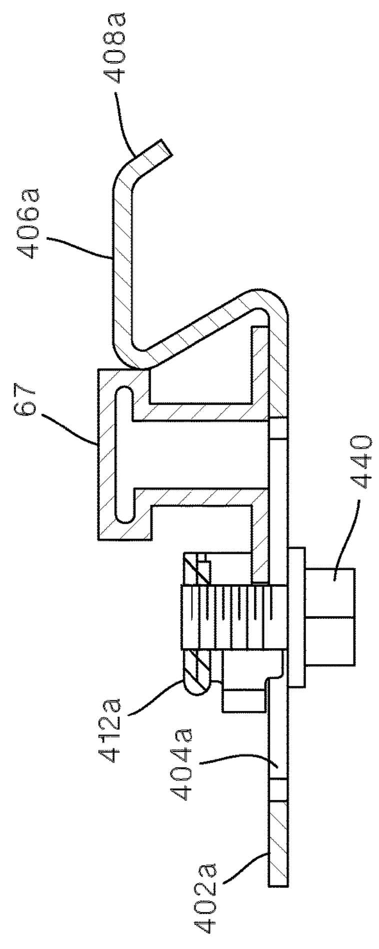
FIG. 45 is a cross sectional view of the cradle clamp bracket assembly taken along line 45-45 of FIG. 44.
Figure 46:
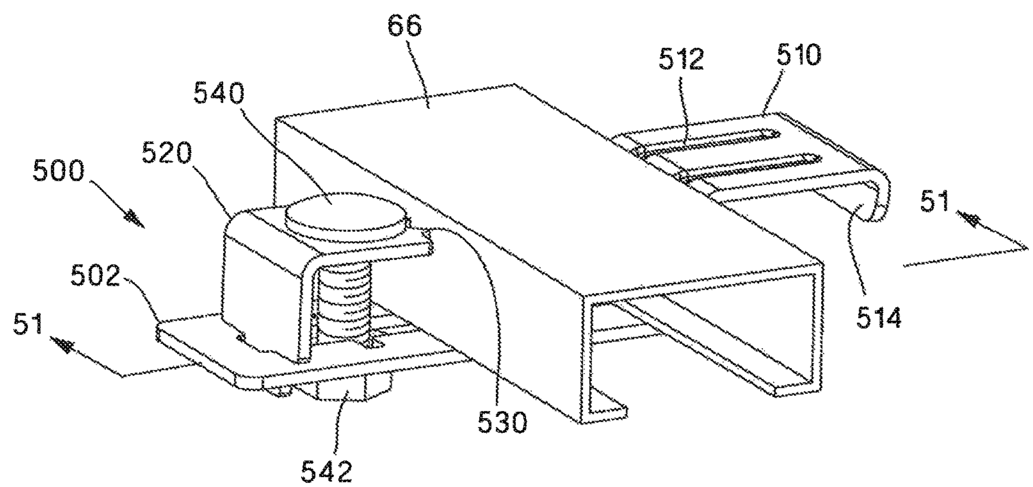
FIG. 46 is a top perspective view of the fifth embodiment of the cradle clamp bracket assembly installed on a ladder rung.
Figure 47:
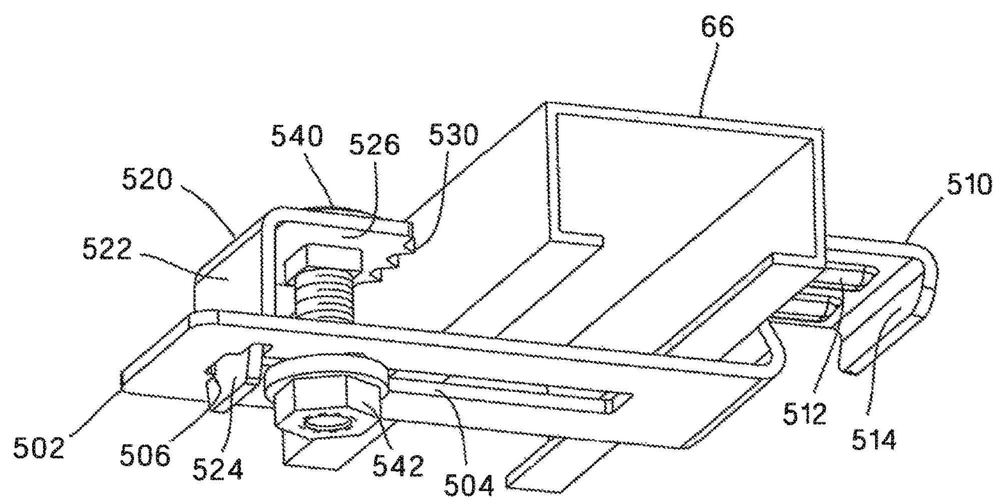
FIG. 47 is a bottom perspective view of the cradle clamp bracket assembly of FIG. 46 installed on a ladder rung.
Figure 48:
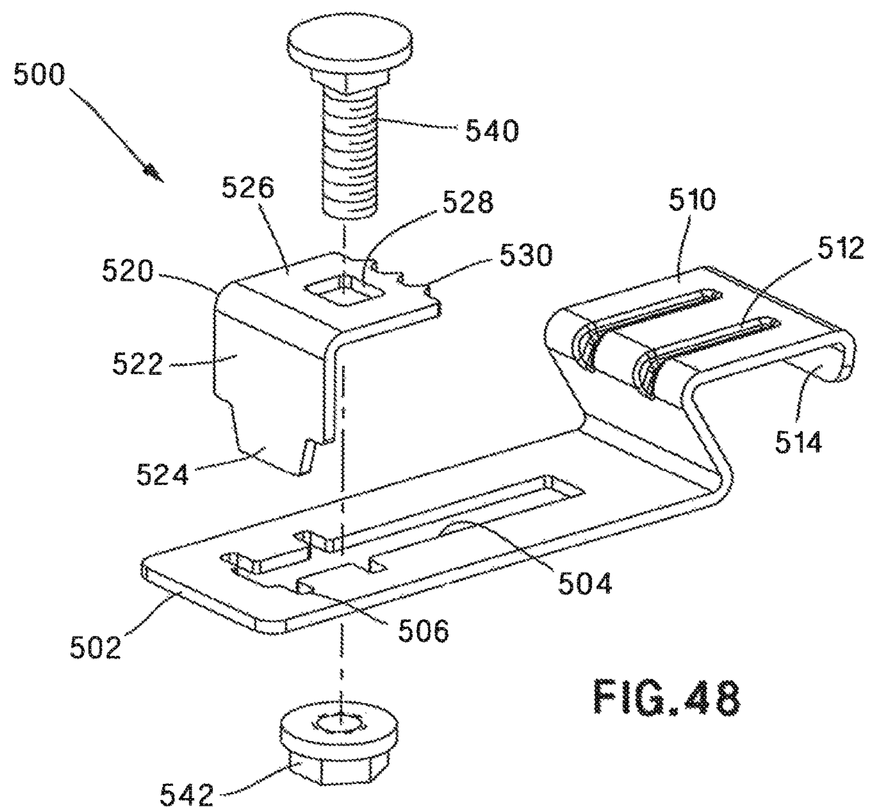
FIG. 48 is an exploded perspective view of the cradle clamp bracket assembly of FIG. 46.
Figure 49:
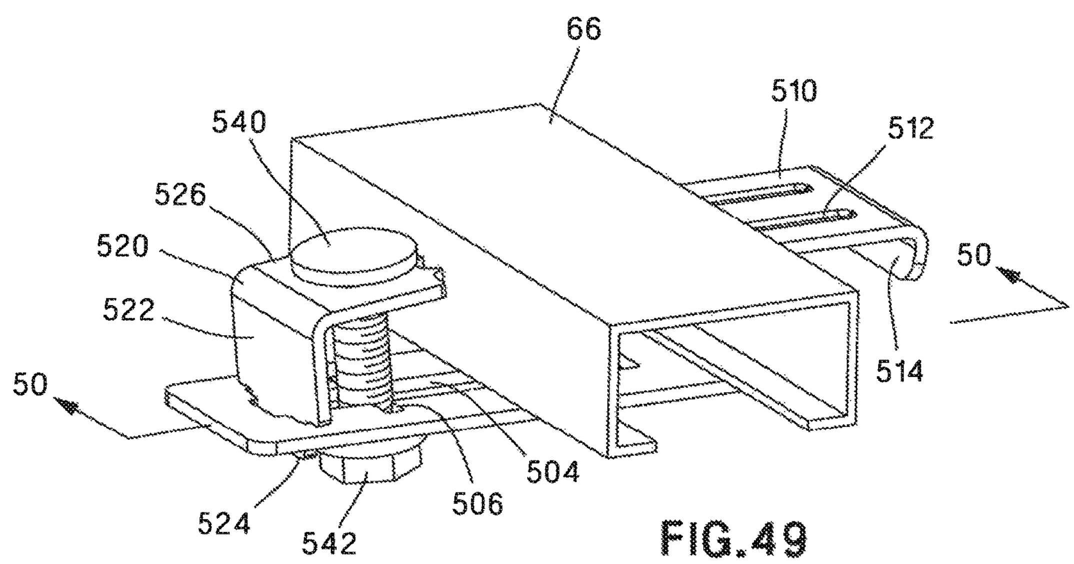
FIG. 49 is a top perspective view of the cradle clamp bracket assembly of FIG. 48 positioned to be secured to a ladder rack.
Figure 50:
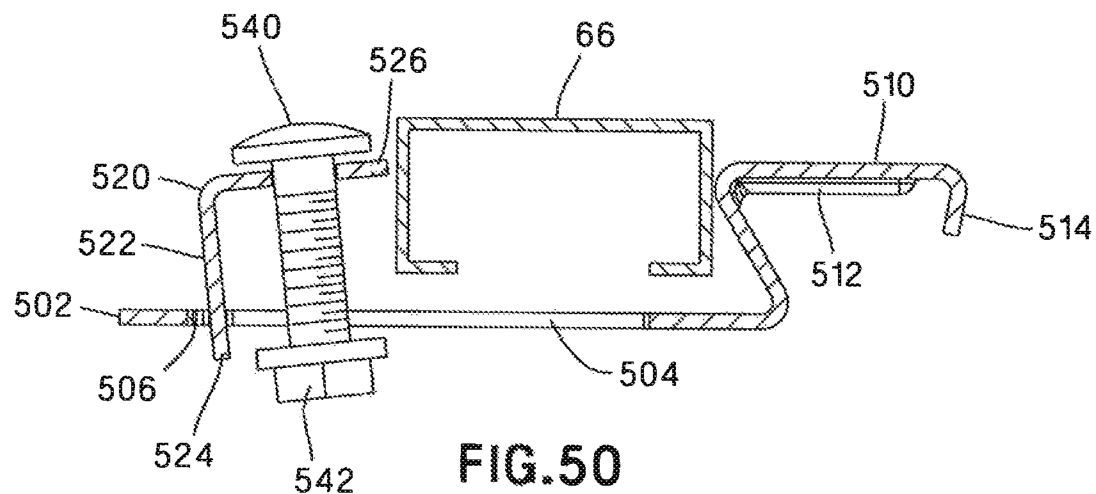
FIG. 50 is a cross sectional view of the cradle clamp bracket assembly and ladder rack taken along line 50-50 of FIG. 49.

FIGS. 25-32 illustrate the cradle clamp bracket assembly 400 installed on a rectangular ladder rung 62. As illustrated in FIGS. 33-36, the cradle clamp bracket assembly 400 may also be used with various types of ladder rungs. For example, the cradle clamp bracket assembly 400 may be used with a strut rung 63 (FIGS. 33-34) or a round rung 64 (FIGS. 35-36). Alternatively, cradle clamp bracket assembly **400*a* may be used with ladder rungs having flanged ends. As illustrated in FIGS. 37-45, cradle clamp bracket assembly 400*a* includes metal bracket 402*a* with a raised member 406*a* having a flange 408*a* and a retainer bracket 412*a*. The retainer bracket 412*a* does not include teeth or flange contact points. Instead, contact points 434*a* are at the bottom of the retainer bracket 412*a* to accommodate the flanged end of a ladder rack 65. Cradle clamp bracket assembly 400*a* may be used with a top hat rung 65 (FIGS. 37-41), inside a strut rung 66 (FIGS. 42-43) or a beam rung 67 (FIGS. 44-45**).

FIGS. 46-53 illustrate a fifth embodiment of a cradle clamp bracket assembly 500 of the present invention. As illustrated in the exploded view of FIG. 48, the cradle clamp bracket assembly 500 includes a slotted bracket 502, a retainer bracket 520, a bolt 540 and a nut 542. The slotted bracket 502 includes an elongated slot 504 that extends the length of the bracket 502 and retainer clip slots 506 that intersect the elongated slot 504. The retainer clip slots 506 enable the cradle clamp bracket assembly 500 to be used with a range of ladder rung widths.

The slotted bracket 502 includes a raised member 510 with at least one gusset 512. The slotted bracket also includes a flange 514 extending downwardly from the raised member 510.

The retainer bracket 520 is L-shaped with a vertical member 522 and a horizontal member 526. The vertical member 522 includes a foot or projection 524 that is positioned within one of the retainer clip slots 506 of the slotted bracket 502. The horizontal member 526 includes an opening 528 for receiving the bolt 540 and a plurality of sharp contact points 530 that secure the bracket assembly 500 to the ladder rung 66 when the nut 542 is tightened, as described below with respect to FIGS. 49-53.

To install the cradle clamp bracket assembly 500, the retainer bracket 520 is placed in one of the retainer clip slots 506 of the slotted bracket 502. More specifically, the foot or projection 524 of the retainer bracket 520 is positioned in one of the retainer clip slots 506. The retainer bracket 520 is positioned in the slot 506 that provides the best untightened fit with the ladder rung 66 to be secured. A carriage bolt 540 is placed in the opening 528 of the retainer bracket 520 and then through the elongated slot 504 of the slotted bracket 502. The nut 542 is then installed on the carriage bolt 540.

Figure 51:
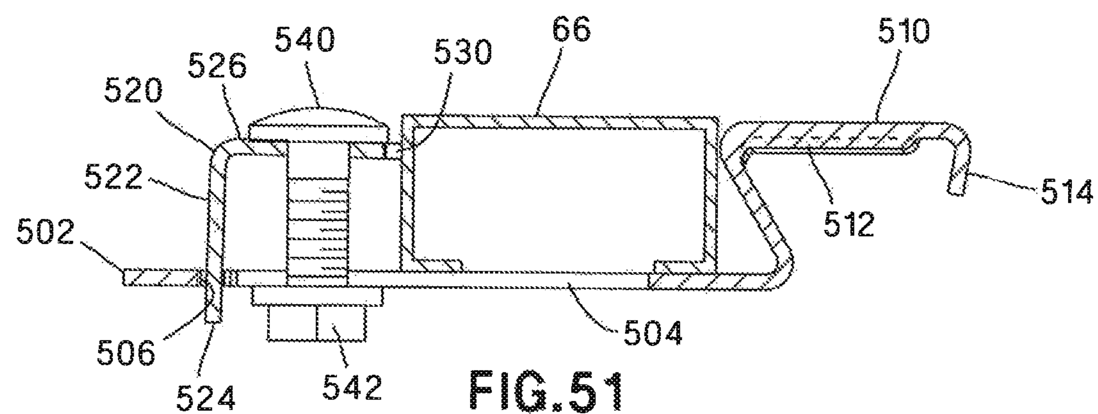
FIG. 51 is a cross sectional view of the cradle clamp bracket assembly and ladder rack taken along line 51-51 of FIG. 46.
Figure 52:
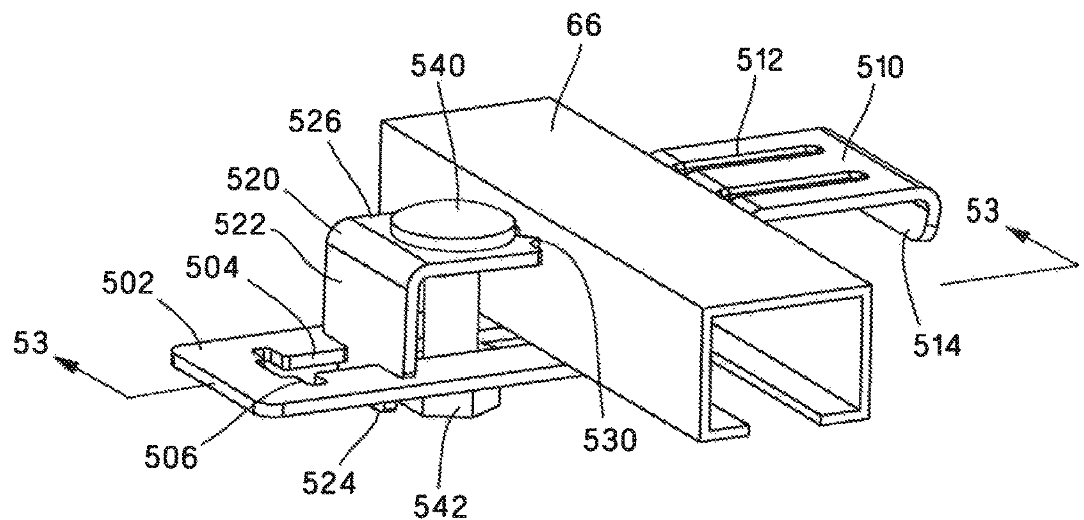
FIG. 52 is a perspective view of the cradle clamp bracket assembly of FIG. 46 positioned on an alternative width ladder rung.
Figure 53:
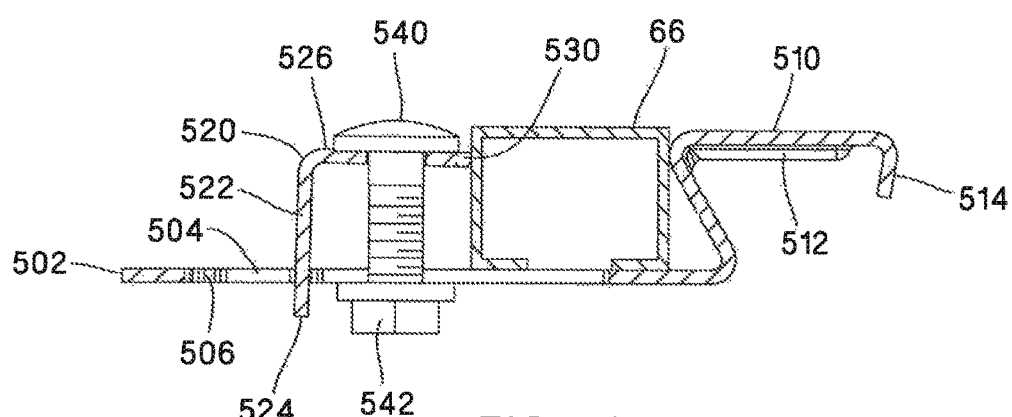
FIG. 53 is a cross sectional view of the cradle clamp bracket assembly and ladder rack taken along line 53-53 of FIG. 52.

The cradle clamp bracket assembly 500 is placed under a ladder rung 66 and the nut 542 is tightened to secure the cradle clamp bracket assembly 500 to the ladder rung 66. As illustrated in FIGS. 51-53, when the nut 542 is tightened, the retainer bracket 520 is forced against the ladder rung 66. As described above, to use the cradle clamp bracket assembly 500 to secure cables to the ladder rung 66, cables would positioned on the ladder rung and a cushion sleeve would be wrapped around the cables. A stainless steel tie or strap would be wrapped around the cables and under the slotted bracket. A tool would be used to tension the tie or strap to complete installation of the cradle clamp bracket assembly 500.

Figure 52A:
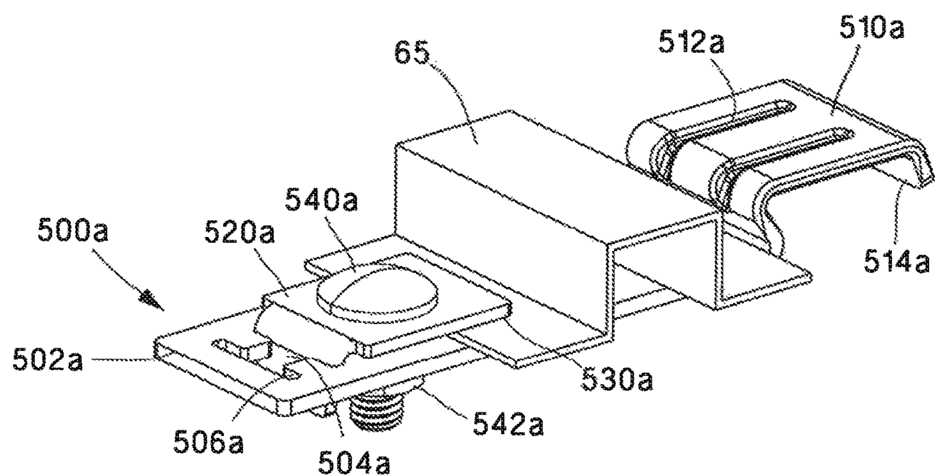
FIG. 52A is a perspective view of the cradle clamp bracket assembly installed on a top hat ladder rung.
Figure 52B:
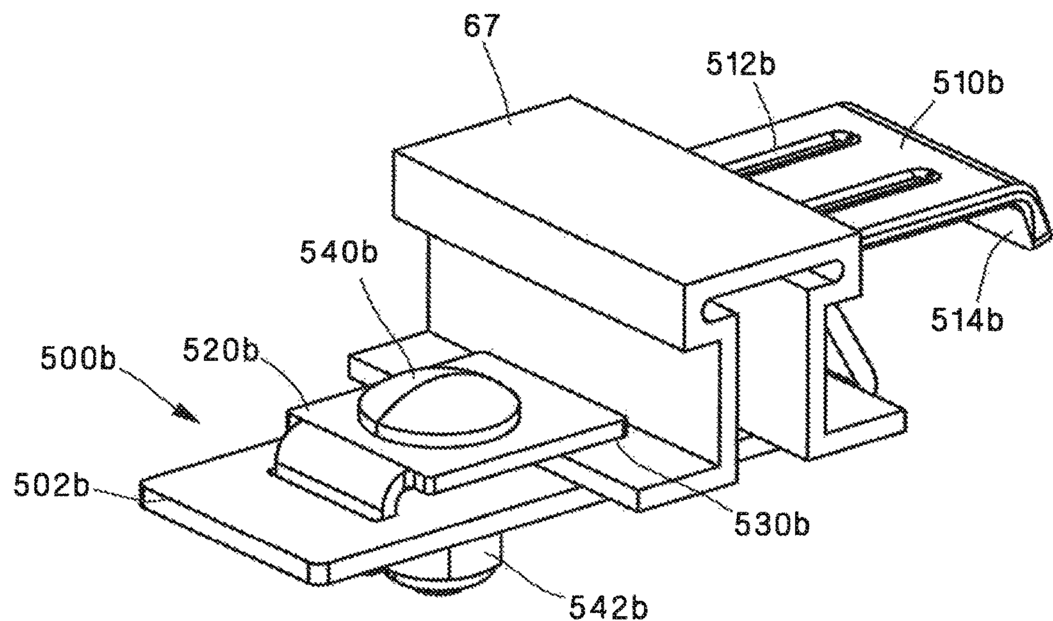
FIG. 52B is a perspective view of the cradle clamp bracket assembly installed on a beam rung.
Figure 53A:
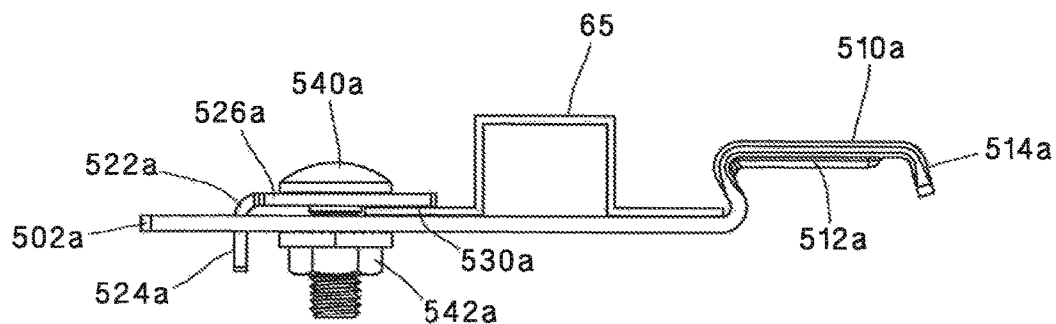
FIG. 53A is a side view of the cradle clamp bracket assembly and top hat ladder rung of FIG. 52A.
Figure 53B:
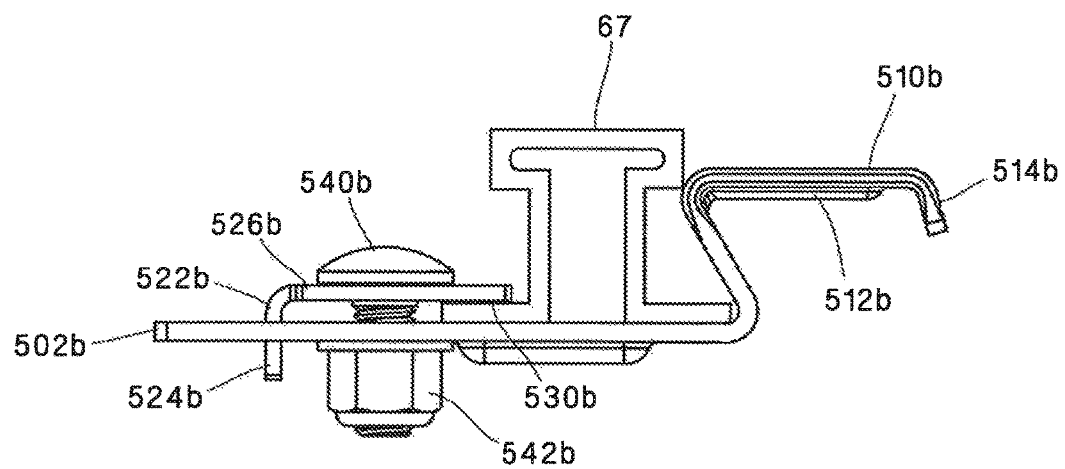
FIG. 53B is a side view of the cradle clamp bracket assembly and the beam rung of FIG. 52B.
Figure 54:
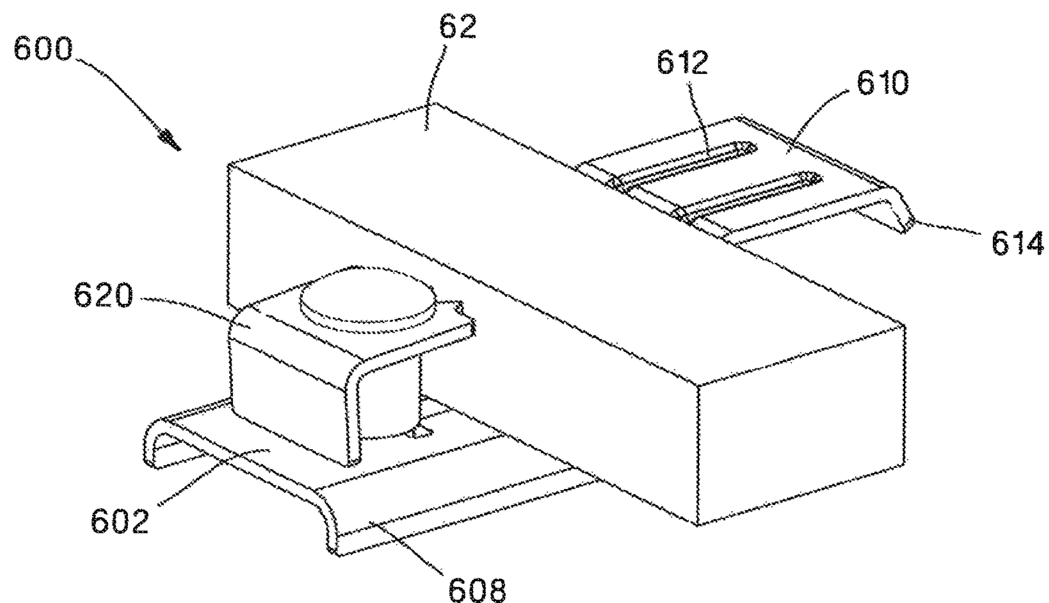
FIG. 54 is a perspective view of a sixth embodiment of the cradle clamp bracket assembly installed on a ladder rung.
Figure 55:
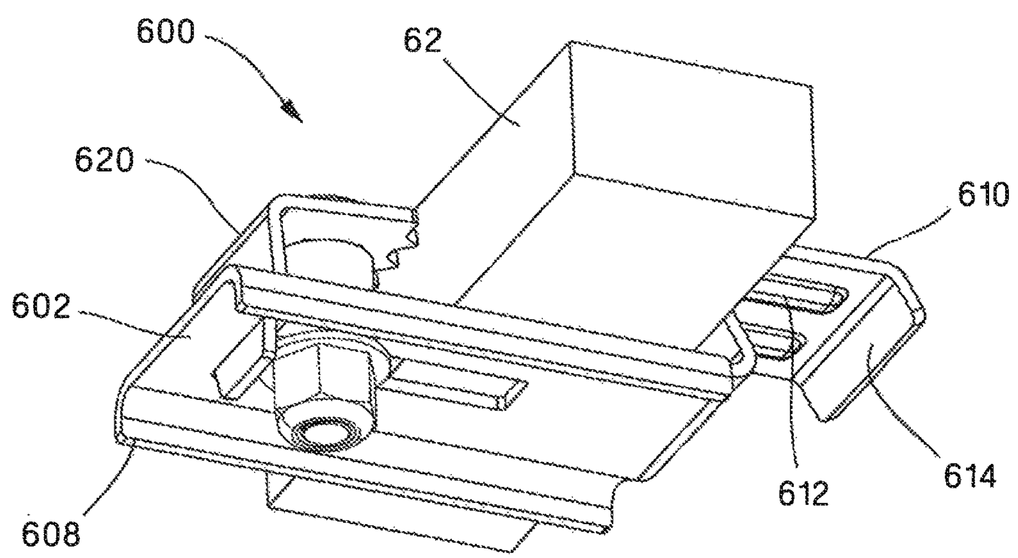
FIG. 55 is a bottom perspective view of the cradle clamp bracket assembly of FIG. 54 installed on a ladder rung.
Figure 56:
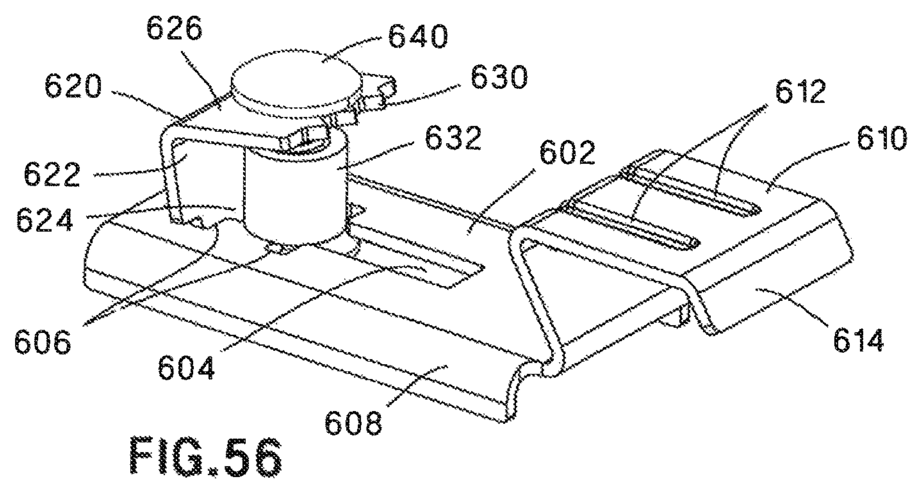
FIG. 56 is a perspective view of the cradle clamp bracket assembly of FIG. 54.
Figure 57:
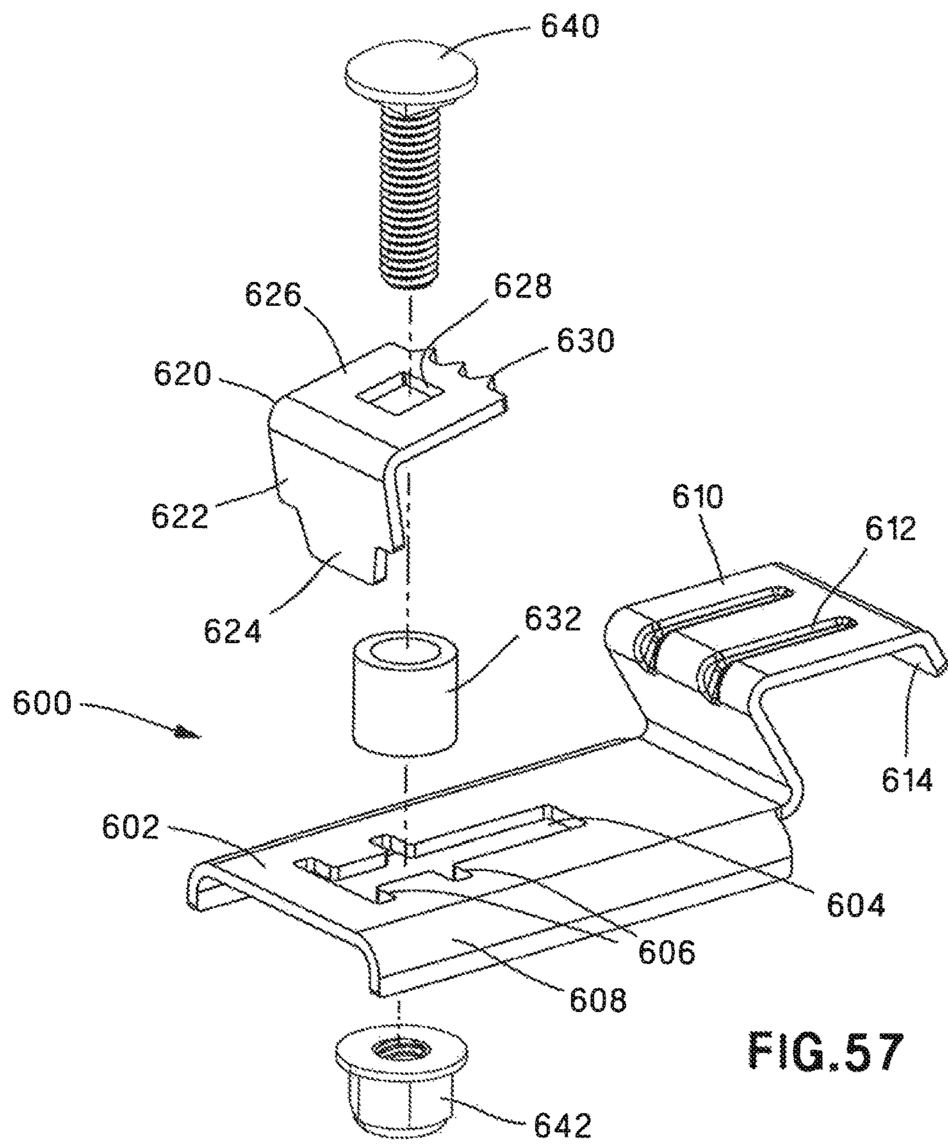
FIG. 57 is an exploded perspective view of the cradle clamp bracket assembly of FIG. 54.
Figure 58:
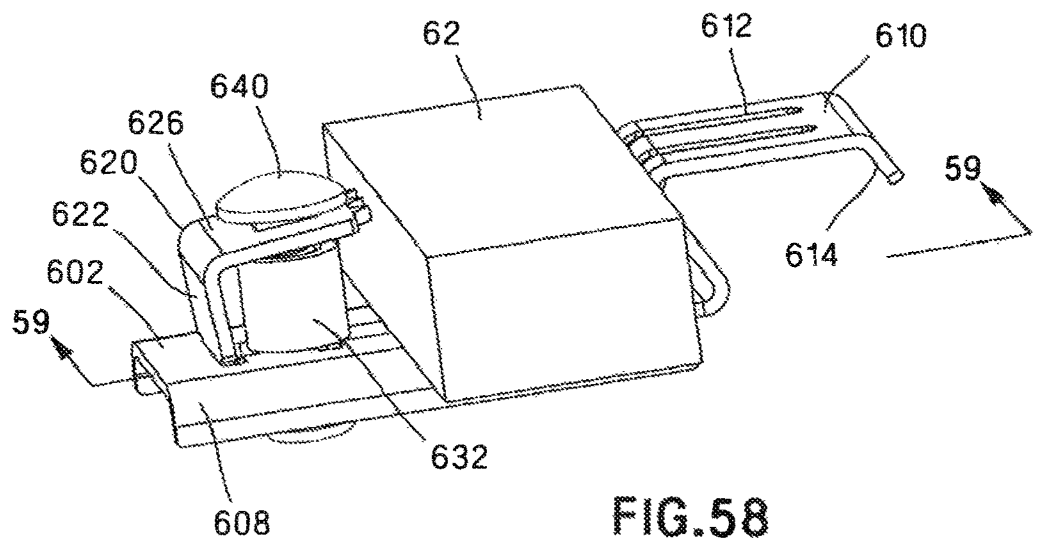
FIG. 58 is a perspective view of the cradle clamp bracket assembly of FIG. 54 prior to being secured to the ladder rung.
Figure 59:
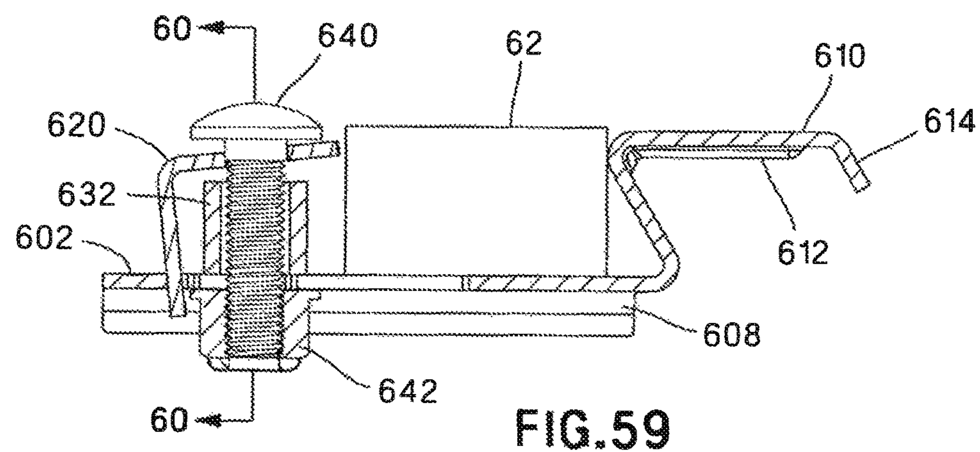
FIG. 59 is a cross sectional view of the cradle clamp bracket assembly of FIG. 58 taken along line 59-59.
Figure 60:
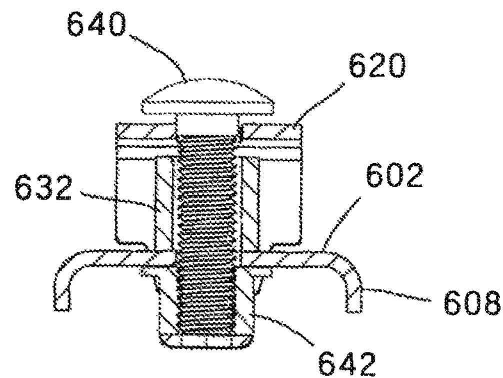
FIG. 60 is a cross sectional view of the cradle clamp bracket assembly of FIG. 59 taken along line 60-60.
Figure 61:
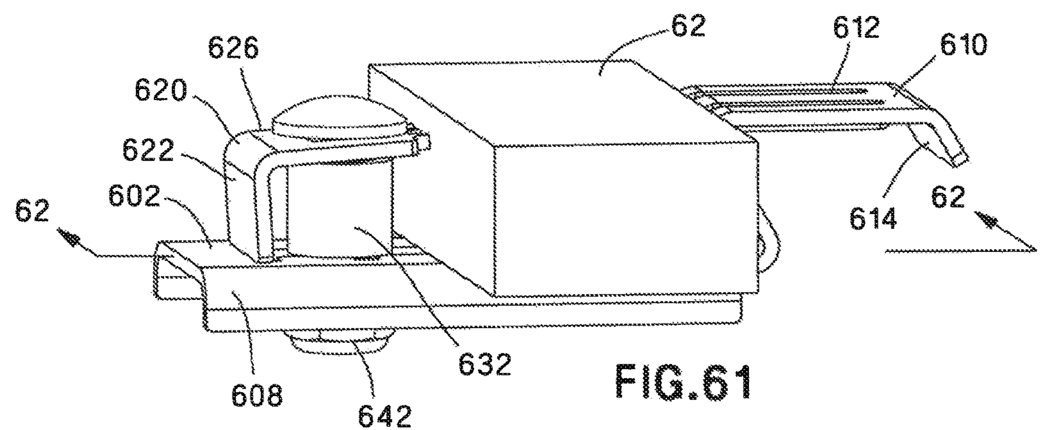
FIG. 61 is a perspective view of the cradle clamp bracket assembly of FIG. 54 being secured to the ladder rung.
Figure 62:
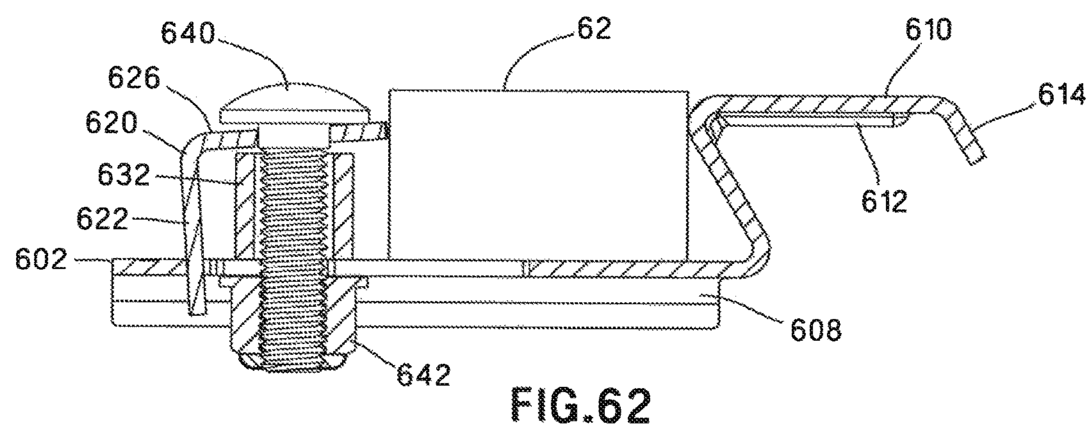
FIG. 62 is a cross sectional view of the cradle clamp bracket assembly of FIG. 61 taken along line 62-62.
Figure 63:
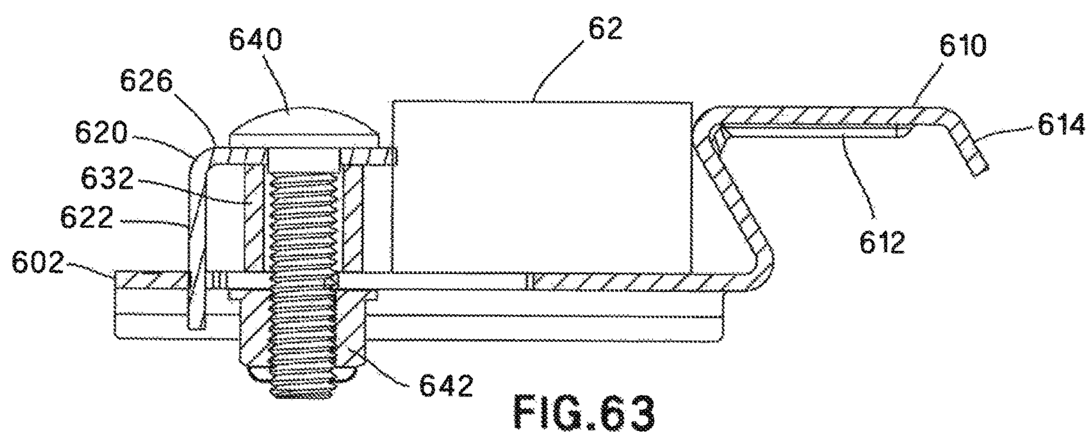
FIG. 63 is a cross sectional view of the cradle clamp bracket assembly of FIG. 62 secured to the ladder rung.
Figure 64:
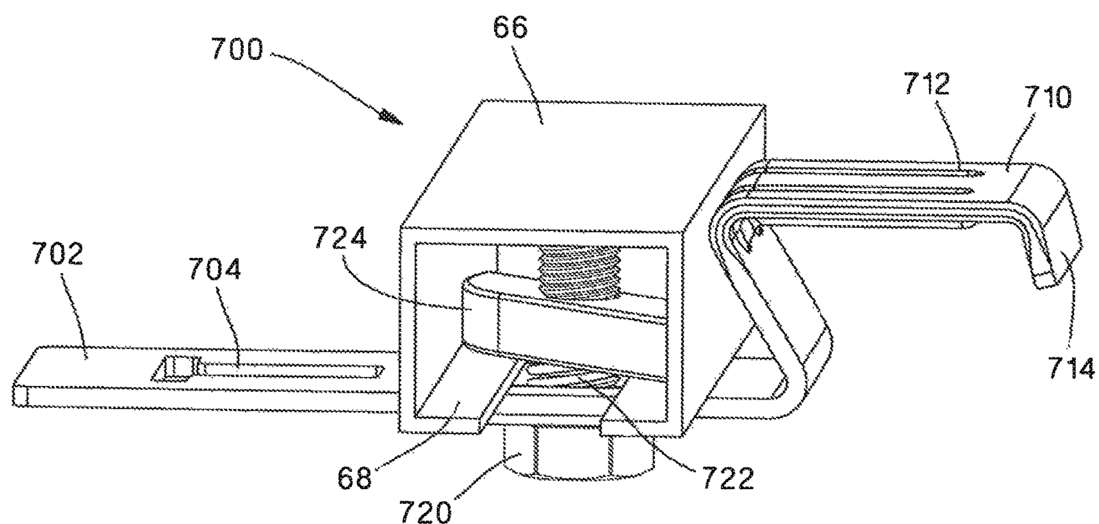
FIG. 64 is a perspective view of a seventh embodiment of the cradle clamp bracket assembly installed on a ladder rung.
Figure 65:
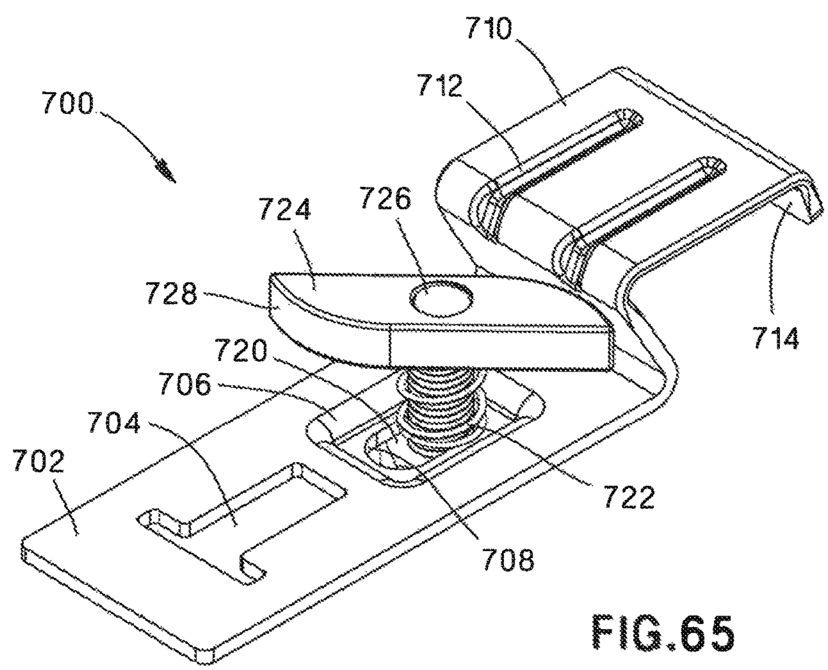
FIG. 65 is a perspective view of the cradle clamp bracket assembly of FIG. 64.
Figure 66:
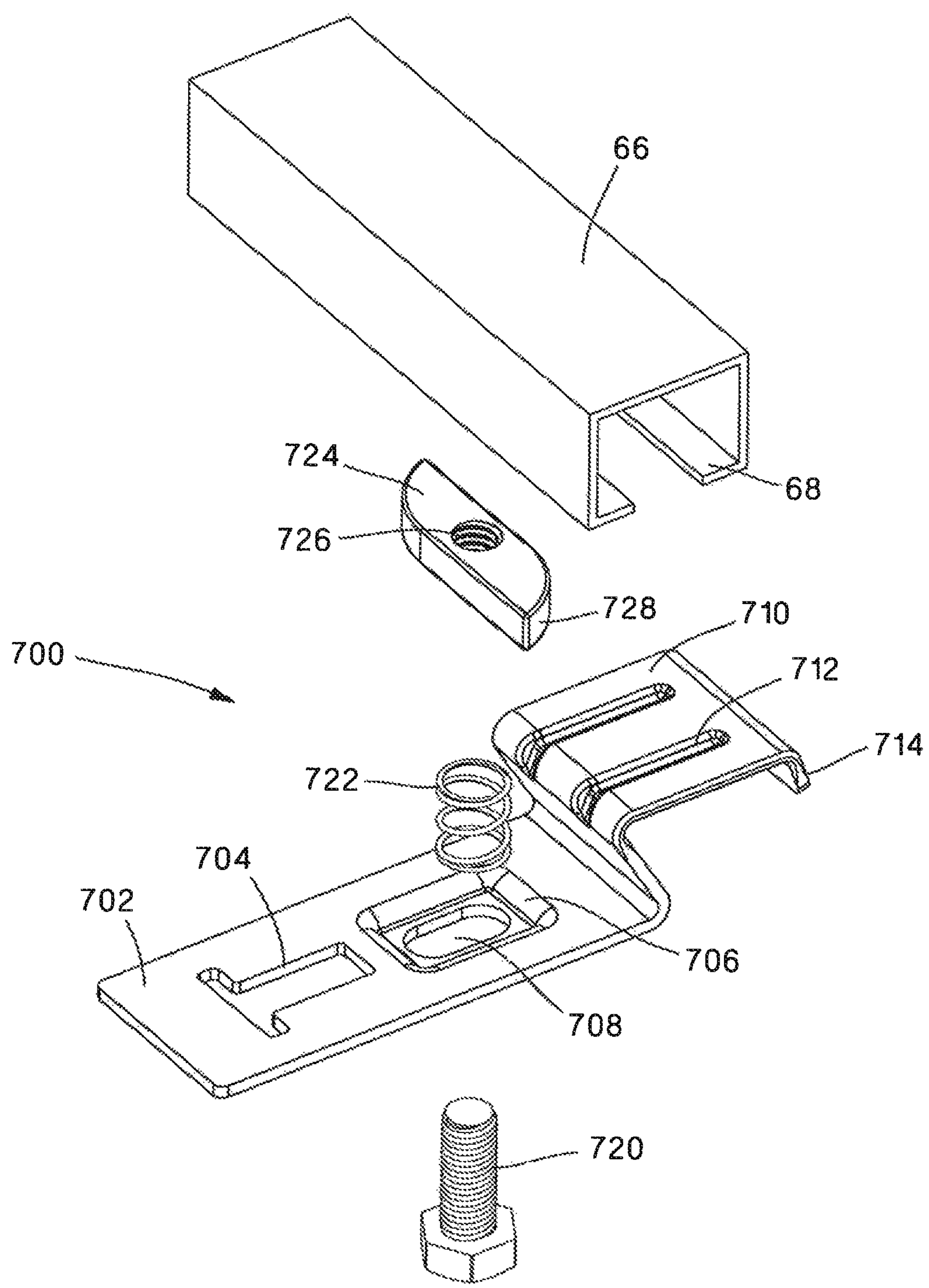
FIG. 66 is an exploded perspective view of the cradle clamp bracket assembly of FIG. 64.

As discussed above, with respect to FIGS. 37-45, the cradle clamp bracket assembly may also be used with ladder rungs having flanged ends. For example, FIGS. 52A and 53A illustrate the cradle clamp bracket assembly **500*a* secured to a top hat rung 65 and FIGS. 52B and 53B illustrate the cradle clamp bracket assembly 500*b* secured to a beam rung 67**.

FIGS. 54-63 illustrate a sixth embodiment of a cradle clamp bracket assembly 600 of the present invention. The cradle clamp bracket assembly 600 includes a slotted bracket 602, a retainer bracket 620, a spacer 632, a bolt 640 and a nut 642. The slotted bracket 602 includes an elongated slot 604 that extends the length of the bracket 602 and retainer clip slots 606 that intersect the elongated slot 604. The retainer clip slots 606 enable the cradle clamp bracket assembly 600 to be used with a range of ladder rung widths. The slotted bracket 602 also includes downwardly extending ribs 608 for providing additional strength to the bracket 602.

The slotted bracket 602 includes a raised member 610 with at least one gusset 612. The slotted bracket 602 also includes a flange 614 extending downwardly from the raised member 610.

The retainer bracket 620 is L-shaped with a vertical member 622 and a horizontal member 626. The vertical member 622 includes a foot or projection 624 that is positioned within one of the retainer clip slots 606 of the slotted bracket 602. The horizontal member 626 includes an opening 628 for receiving the bolt 640 and a plurality of sharp contact points 630 that secure the bracket assembly 600 to the ladder rung when the nut 642 is tightened, as described below with respect to FIGS. 58-63.

As illustrated in FIGS. 58-63, the retainer bracket 620 is designed to engage the ladder rung 62 at an angle to increase the retention strength of the cradle clamp bracket assembly 600 to the ladder rung 62. The cradle clamp bracket assembly 600 further includes a spacer 632. The spacer 632 creates a positive stop that will prevent the installer from over tightening the bolt 640.

To install the cradle clamp bracket assembly 600, the foot or projection 624 of the retainer bracket 620 is positioned in one of the retainer clip slots 606. The retainer bracket 620 is positioned in the slot 606 that provides the best untightened fit with the ladder rung 62 to be secured. A carriage bolt 640 is placed in the opening 628 of the retainer bracket 620 and then through the elongated slot 604 of the slotted bracket 602. The nut 642 is then installed on the carriage bolt 640.

The cradle clamp bracket assembly 600 is placed under a ladder rung 62 and the nut 642 is tightened to secure the cradle clamp bracket assembly 600 to the ladder rung 62. As illustrated in FIGS. 58-63, when the nut 642 is tightened, the retainer bracket 620 is forced against the ladder rung 62. As described above, to use the cradle clamp bracket assembly 600 to secure cables to the ladder rung 62, cables would be positioned on the ladder rung and a cushion sleeve would be wrapped around the cables. A stainless steel tie or strap would be wrapped around the cables and under the slotted bracket. A tool would be used to tension the tie or strap to complete installation of the cradle clamp bracket assembly 600.

FIGS. 64-71 illustrate a seventh embodiment of a cradle clamp bracket assembly 700 of the present invention. The cradle clamp bracket assembly 700 is designed to engage the flanges of a strut ladder rung and sandwich the flanges between a bracket and a ladder rung nut of the cradle clamp bracket assembly 700.

The cradle clamp bracket assembly 700 includes a bracket 702, a screw 720, a compression spring 722 and a ladder rung nut 724. The ladder rung nut 724 includes a threaded hole 726 and curved surfaces 728. The bracket 702 includes a T-shaped slot 704, a recessed area 706 with a slot 708, a raised member 710 with gussets 712, and a flange 714 extending downwardly from the raised member 710.

The recessed area 706 and slot 708 accommodate the screw 720, the compression spring 722 and the ladder rung nut 724. The compression spring 722 keeps the screw 720 and ladder rung nut 724 upright for easier installation when the bracket 702 is installed onto the ladder rung 66. The recessed area 706 allows the fully compressed height of the spring 722 to sit recessed thereby allowing the ladder rung nut 724 to seat on various ladder rungs. The slot 708 enables the screw 720 and the ladder rung nut 724 to be centered thereby enabling the bracket assembly to be secured to a range of ladder rung widths found on the market.

Figure 67:
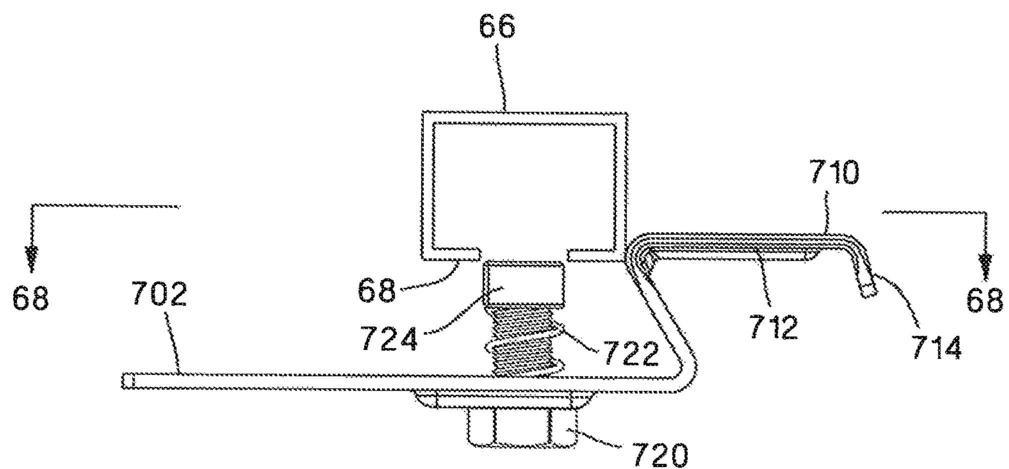
FIG. 67 is a side view of the cradle clamp bracket assembly of FIG. 64 positioned to be installed on a ladder rung.
Figure 68:
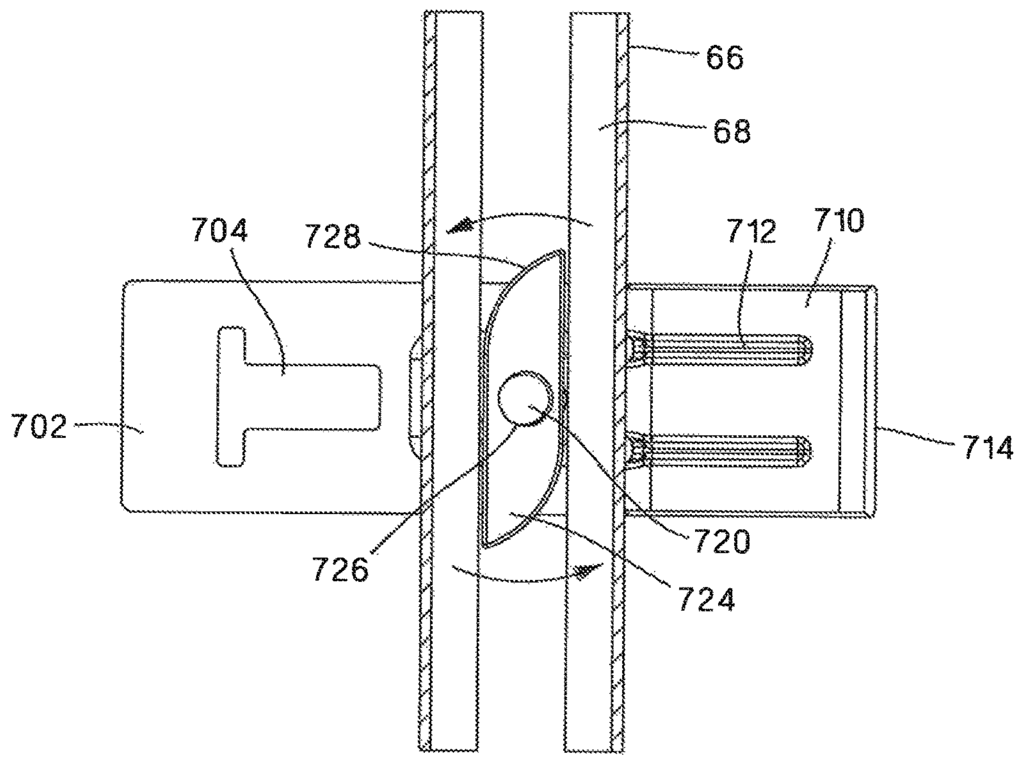
FIG. 68 is a cross sectional view of the cradle clamp bracket assembly of FIG. 67 taken along line 68-68.
Figure 69:
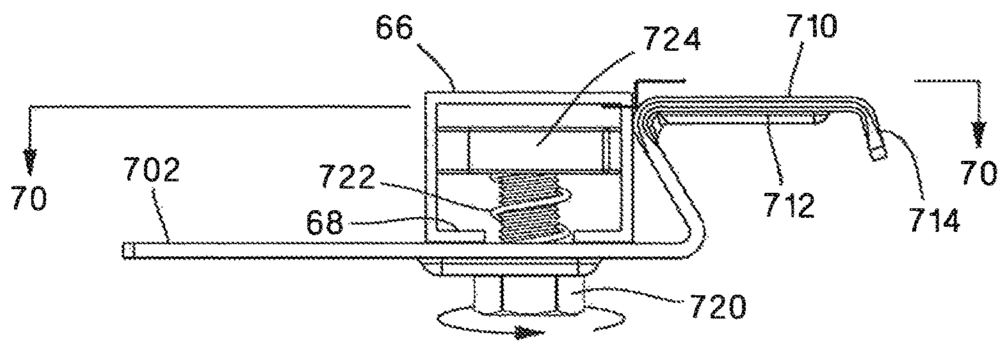
FIG. 69 is a side view of the cradle clamp bracket assembly of FIG. 64 partially installed on a ladder rung.
Figure 70:
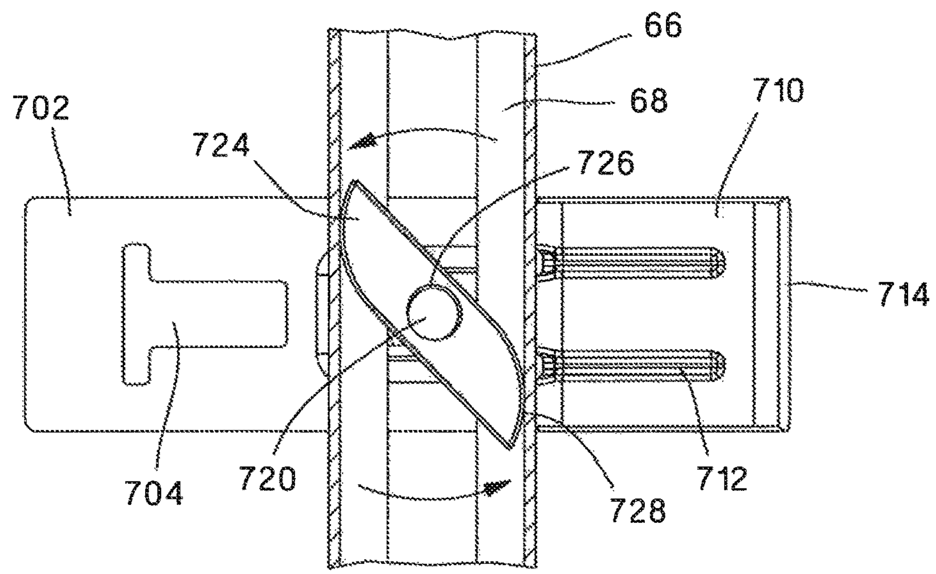
FIG. 70 is a cross sectional view of the cradle clamp bracket assembly of FIG. 69 taken along line 70-70.
Figure 71:
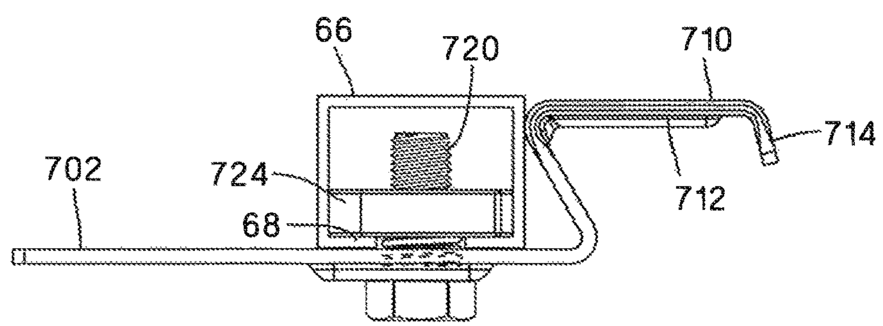
FIG. 71 is a side view of the cradle clap bracket assembly of FIG. 64.

FIGS. 67-71 illustrate the installation of the cable clamp bracket assembly 700. As illustrated in FIG. 67, the screw 720 and ladder rung nut 724 installed in the bracket 702 are positioned under a ladder rung 66. The ladder rung nut 724 will rotate along with the screw 720 until the curved surfaces 728 of the ladder rung nut 724 engage with the inner walls of the ladder rung 66. As the screw 720 is tightened the ladder rung nut 724 clamps onto the flanges 68 of the ladder rung 66.

As described above, to use the cradle clamp bracket assembly 700 to secure cables to the ladder rung 66, cables would be positioned on the ladder rung and a cushion sleeve would be wrapped around the cables. A stainless steel tie or strap would be wrapped around the cables and under the slotted bracket. A tool would be used to tension the tie or strap to complete installation of the cradle clamp bracket assembly 700.

The cradle clamp bracket assemblies of the present invention are designed to be used with multiple cable sizes and a variety of ladder rack and cable tray styles. The contact points on the brackets create a concentrated force when locked which is critical for short circuit applications. The cushion sleeve provides resistance to cable movement and protects cables from damage. The cradle clamp bracket assemblies of the present invention also have a reduced installation time as the bracket assemblies only require a single common tool for installation. The cradle clamp bracket assemblies provide a significant cost advantage over conventional cable cleats by reducing material costs and increasing labor efficiency.

FIGS. 72-80 illustrate an alternative bracket assembly for securing cables to a fiberglass ladder cable rack having marine style ladder rungs. As illustrated in FIG. 1, cable ladder racks typically include two longitudinal members, or side rails, and a plurality of transverse members, or rungs, fastened and bonded to the side rails. One style of ladder rung is a marine ladder rung 860 (see FIG. 72). The marine ladder rung 860 include a square or rectangular body 862 with a flange 864 extending from one side of the body 862. The bracket assembly of the present invention is designed to receive the square or rectangular body of a Marine style ladder rung.

FIGS. 72-75 illustrate one embodiment of the bracket assembly 900. The bracket 902 includes a bottom portion 904, side walls 906 and an upper portion 908. The bottom portion 904 and side walls 906 define a rung insertion area 910. The rung insertion area 910 has a square or rectangular cross sectional area to accommodate the body 862 of the marine ladder rung 860.

Figure 75:
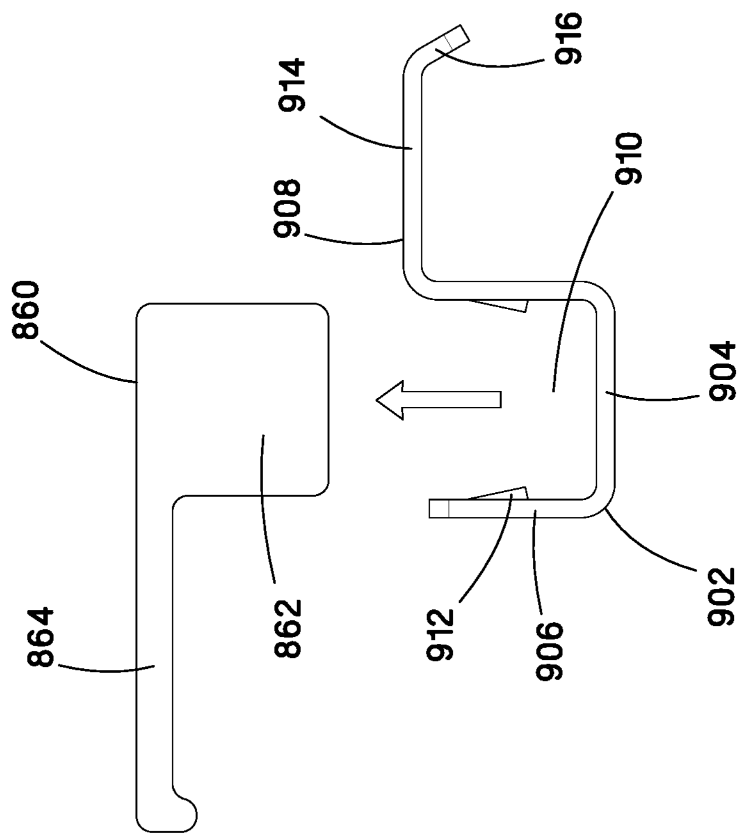
FIG. 75 is a side exploded view of a ladder rung positioned to be installed in the bracket of FIG. 74.

The side walls 906 of the bracket 902 include lanced tabs 912. The lanced tabs 912 are triangular tabs that extend inwardly into the rung insertion area 910 of the bracket 902. The lanced tabs 912 create an interference fit as the bracket 902 is installed on the body 862 of the marine ladder rung 860. As illustrated in FIG. 75, the bracket 902 is positioned below the body 862 of the marine ladder rung 860 allowing the bracket 902 to be snapped onto the body 862. The simple installation of the bracket 902 on the marine ladder rung 860 requires no tools.

The upper portion 908 extends from one of the sidewalls 906 forming a flange 914 or tongue with a downwardly extending distal end 916. The upper portion flange 914 is designed to receive a cushion sleeve 880 and a stainless steel tie 890 or strap. The upper portion flange 914 extends in a direction opposite of the flange 864 of the marine ladder rung 860.

Figure 72:
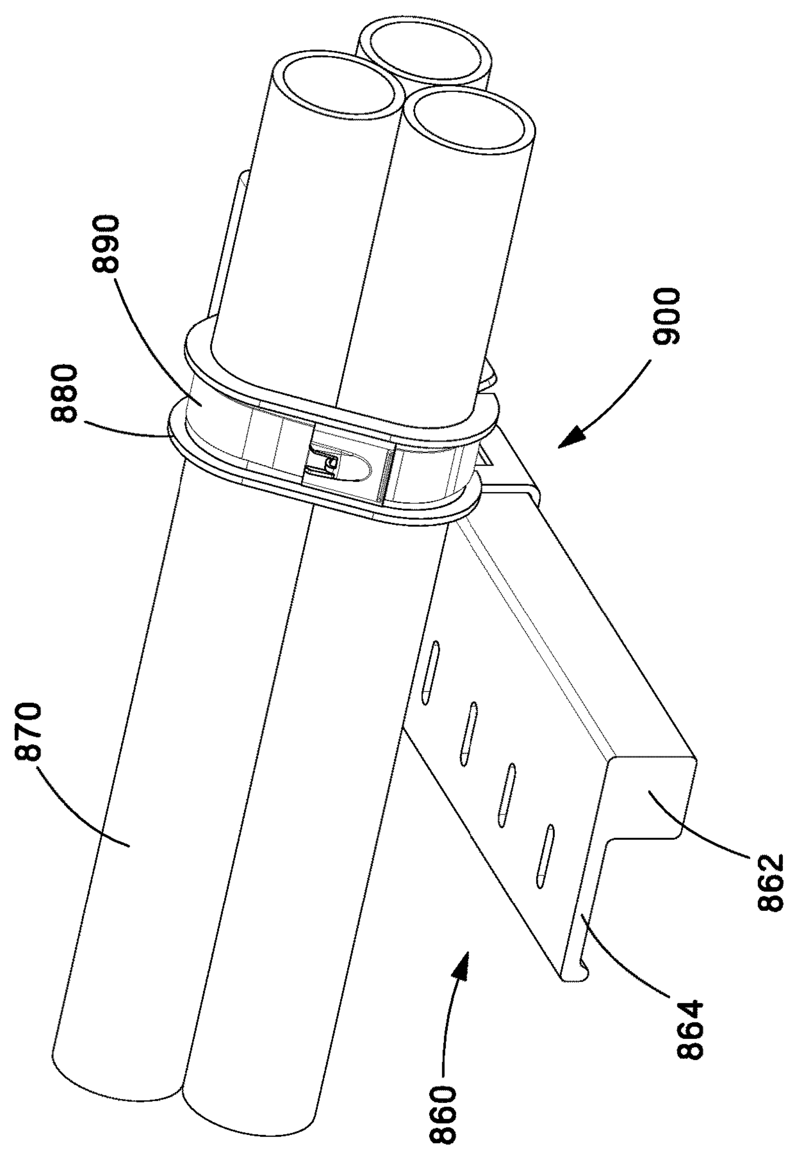
FIG. 72 is a perspective view of an alternative bracket assembly installed on a marine ladder rung.
Figure 73:
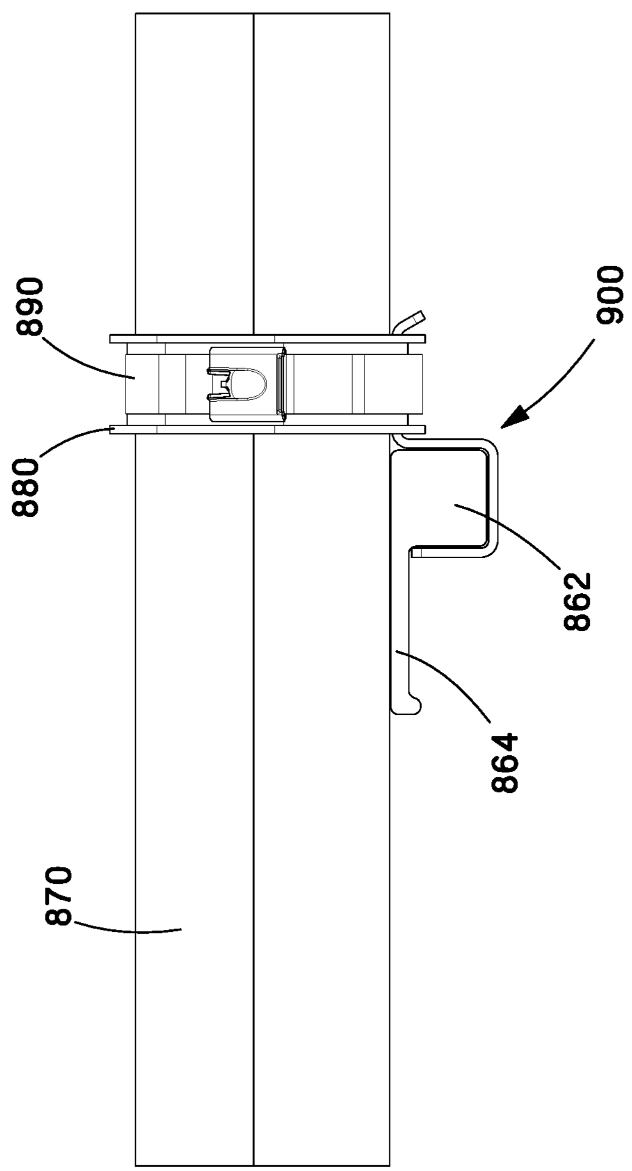
FIG. 73 is a side view of the bracket assembly of FIG. 72 installed on the marine ladder rung.

FIGS. 72 and 73 illustrate the bracket assembly secured to a marine ladder rung with a bundle of cable installed thereto. The flange 864 of the marine ladder rung 860 and the flange 914 of the upper portion 908 of the bracket 900 are positioned in the same plane. The cable bundle 870 is supported by the flange 864 of the marine ladder rung 860 and the upper portion 914 of the bracket 902. As discussed above with respect to the alternative clamp brackets, a cushion sleeve 880 is positioned around the cable bundle 870 and the bracket 902. A stainless steel tie 890 or strap is wrapped around the cushion sleeve 880 and bracket 902 to secure the cable bundle 870.

Figure 77:
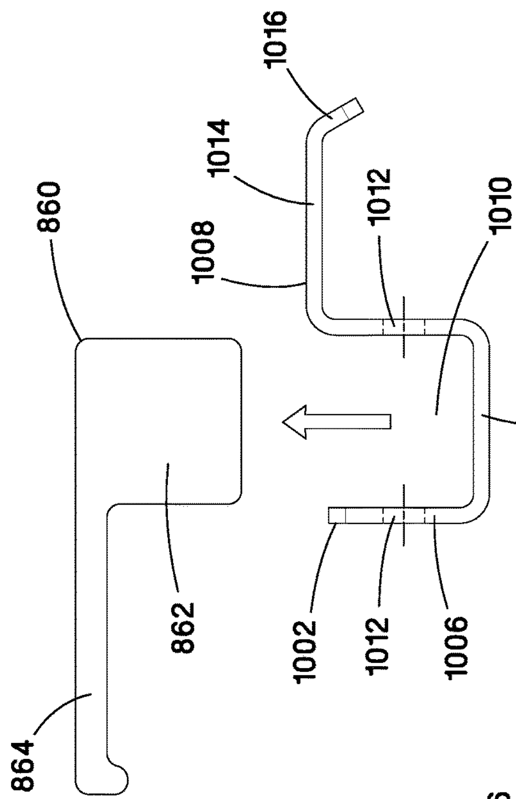
FIG. 77 is a side exploded view of a ladder rung positioned to be installed in the bracket of FIG. 76.
Figure 78:
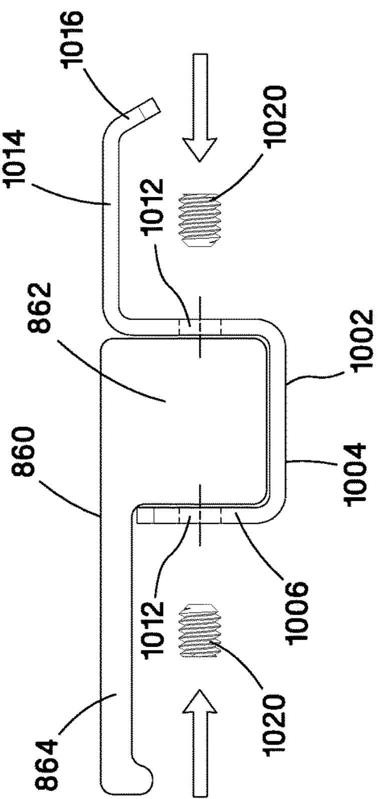
FIG. 78 is a side view of the ladder rung installed in the bracket of FIG. 77 with set screws positioned to be installed in the bracket.
Figure 76:
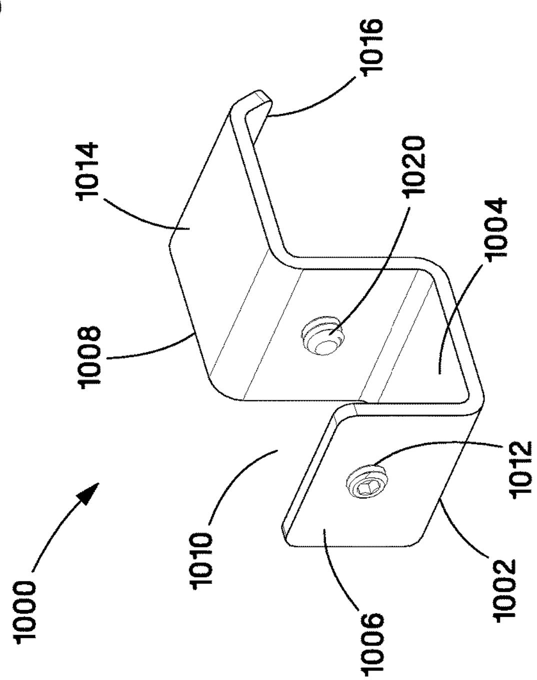
FIG. 76 is an alternative bracket to be installed on the ladder rung of FIG. 72.

FIGS. 76-78 illustrate an alternative embodiment of the bracket assembly 1000 for marine ladder rungs 860. The bracket 1002 includes a bottom portion 1004, side walls 1006 and an upper portion 1008. The bottom portion 1004 and side walls 1006 define a rung insertion area 1010. The rung insertion area 1010 has a square or rectangular cross sectional area to accommodate the body 862 of a marine ladder rung 860.

The side walls 1006 of the bracket 1002 include openings 1012 for receiving set screws 1020. As illustrated in FIG. 78, set screws 1020 are installed in the side walls 1006 of the bracket 1002 to create an interference fit when the bracket 1002 is installed on the marine ladder rung 860. As illustrated in FIG. 78, one or two knurled grip cup-point set screws 1020 are installed, via a common tool, to create the interference with the body 862 of the marine ladder rung 860.

The upper portion 1008 extends from one of the side walls 1006 to form a flange 1014 or tongue with a downwardly extending distal end 1016. The upper portion flange 1014 is designed to receive a cushion sleeve 880 and a stainless steel tie 890 or strap. The upper portion flange 1014 extends in a direction opposite of the flange 864 of the marine ladder rung 860. As illustrated in FIG. 78, the flange 864 of the marine ladder rung 860 and the flange 1014 of the upper portion 1008 of the bracket 1002 are positioned in the same plane. As a result, just as illustrated with respect to the bracket assembly 900 in FIGS. 72 and 73, a cable bundle 870 can be supported on the flange 864 of the marine ladder rung 860 and the upper portion flange 1014 of the bracket 1002.

Figure 74:
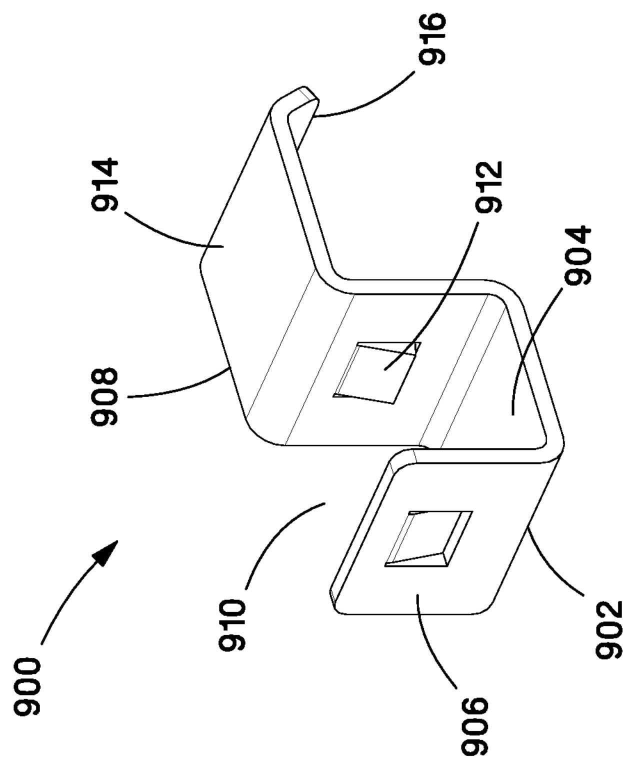
FIG. 74 is a perspective view of the bracket of FIG. 72.
Figure 79:
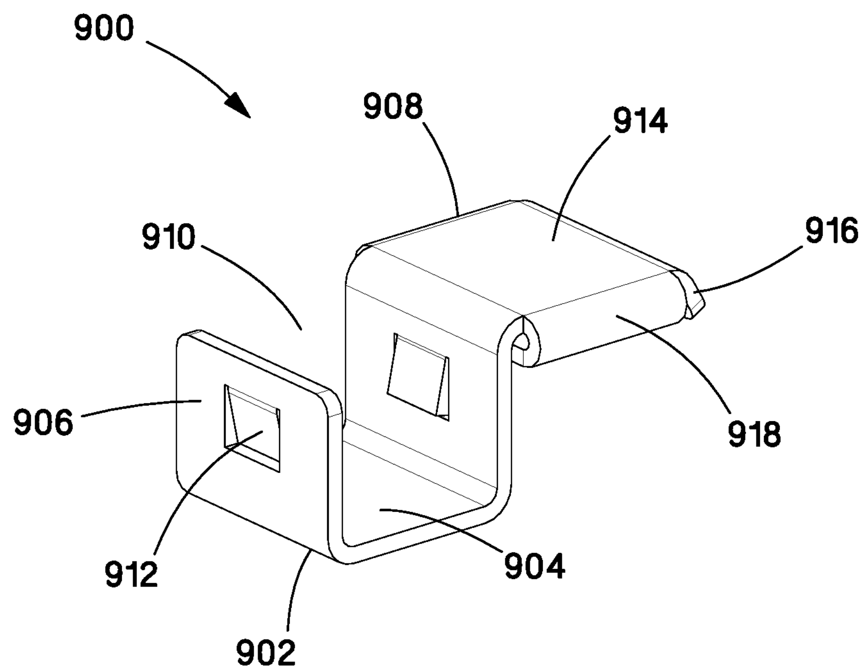
FIG. 79 is a perspective view of the bracket of FIG. 74 with hemmed edges.
Figure 80:
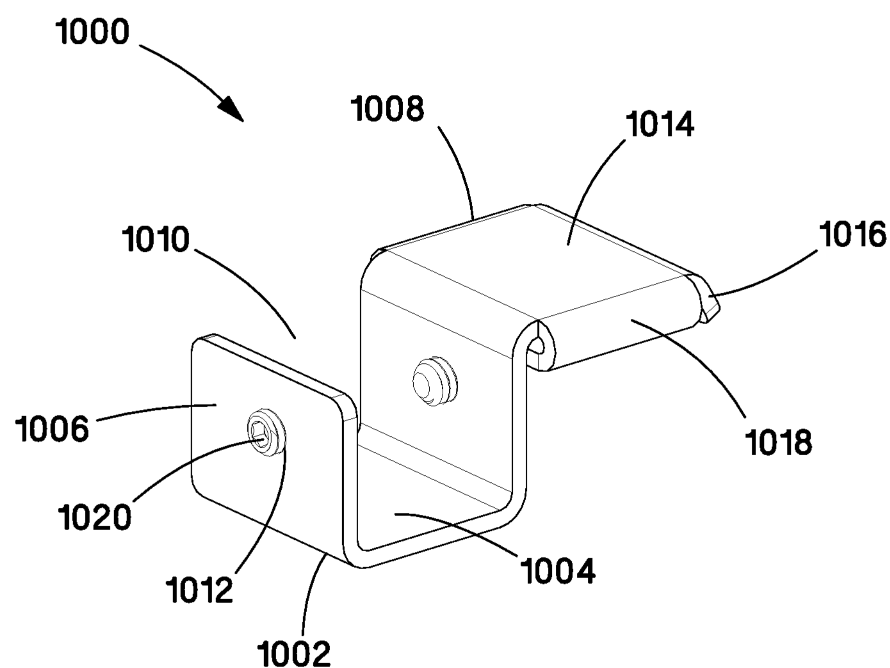
FIG. 80 is a perspective view of the bracket of FIG. 76 with hemmed edges.

FIGS. 79-80 illustrate the brackets 902, 1002 of FIGS. 74 and 76, respectively, with rounded or hemmed edges 918, 1018 along the flange 914, 1014 of the upper portion 908, 1008. The rounded or hemmed edges 918, 1018 remove the possibility of any sharp edges on the brackets thereby preventing any damage to the cables, cushion sleeve, and cable tie or strap installed thereon.

The bracket assembly of the present invention is used for cable management and cable management during short circuit events. During a short circuit event, cables repel with significant force. The bracket assembly of the present invention is designed to hold the cable to the ladder rack and the stainless steel tie holds the cable together preventing any damage during the short circuit event.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation.

The invention claimed is:

1. A bracket secured to a ladder rack for securing at least one cable to the ladder rack, the bracket and ladder rack comprising:

a ladder rung, the ladder rung having a bottom with distal ends, two sides extending upwards from the distal ends of the bottom to a top surface forming a rectangular body, and a flange extending from one side;

a bracket having a bottom portion, parallel sidewalls, and an upper portion; wherein the bottom portion and the parallel sidewalls of the bracket define a rung insertion area that receives the rectangular body of the ladder rung, wherein the bottom portion and the parallel sidewalls surround the bottom and the two sides of the rectangular body of the ladder rung, the upper portion extends in a direction opposite the flange of the ladder rung, wherein the bracket is secured to the ladder rung; and whereby the at least one cable is positioned on the flange of the ladder rung and the upper portion of the bracket, and a tie secures the at least one cable to the upper portion of the bracket.

2. The bracket and ladder rack of claim 1, wherein the flange is an extension of the top surface of the rectangular body of the ladder rung.

3. The bracket and ladder rack of claim 1, wherein the ladder rung is fiberglass.

4. The bracket and ladder rack of claim 1, wherein each sidewall includes a lanced tab extending inwardly into the rung insertion area of the bracket, wherein each lanced tab creates an interference fit between the bracket and the ladder rung.

5. The bracket and ladder rack of claim 1, wherein the upper portion includes a flange defining a cable tie receiving area.

6. The bracket and ladder rack of claim 5, wherein the flange of the upper portion is parallel to the flange of the ladder rung.

7. The bracket and ladder rack of claim 5, wherein the flange of the upper portion is in the same plane as the ladder rung.

8. The bracket and ladder rack of claim 1, wherein each sidewall includes an opening for receiving a set screw to provide an interference when the bracket is installed on the ladder rung.

9. The bracket and ladder rack of claim 1, wherein the upper portion includes hemmed edges for protecting the at least one cable against sharp edges.

* * * * *